US012803772B2

(12) United States Patent
You et al.

(10) Patent No.: US 12,803,772 B2
(45) Date of Patent: Nov. 17, 2026

(54) METHOD FOR OPERATING TERMINAL IN WIRELESS COMMUNICATION SYSTEM, AND DEVICE USING SAME

(71) Applicant: LG Electronics Inc., Seoul (KR)

(72) Inventors: Hyangsun You, Seoul (KR); Hyunsoo Ko, Seoul (KR); Kijun Kim, Seoul (KR); Seonwook Kim, Seoul (KR); Jaenam Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 18/578,950

(22) PCT Filed: Jul. 13, 2022

(86) PCT No.: PCT/KR2022/010211
§ 371 (c)(1),
(2) Date: Jan. 12, 2024

(87) PCT Pub. No.: WO2023/287195
PCT Pub. Date: Jan. 19, 2023

(65) Prior Publication Data

US 2024/0388413 A1 Nov. 21, 2024

(30) Foreign Application Priority Data

Jul. 13, 2021 (KR) ........................ 10-2021-0091296

(51) Int. Cl.
*H04W 72/04* (2023.01)
*H04L 5/00* (2006.01)
*H04L 5/14* (2006.01)

(52) U.S. Cl.
CPC .......... *H04L 5/1469* (2013.01); *H04L 5/0094* (2013.01)

(58) Field of Classification Search
CPC ....... H04L 5/1469; H04L 5/0094; H04L 5/14; H04W 72/0446; H04W 72/04
See application file for complete search history.

(56) References Cited

U.S. PATENT DOCUMENTS 12,513,724 B2 * 12/2025 Liu ....................... H04L 5/0044
2020/0150917 A1 * 5/2020 Yang ..................... G06F 3/1454
(Continued)

FOREIGN PATENT DOCUMENTS

WO 2020/207143 A1 10/2020
WO WO 2020/258193 12/2020
WO WO 2021/069506 4/2021

OTHER PUBLICATIONS

5G; NR; Radio Resource Control (RRC); Protocol specification (Release 16), Apr. 2021, 3GPP TS 38.331 V16.4.1 (Apr. 2021), 933 pages.
(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

Provided are a device and a method for operating same in a wireless communication system. The device may be a terminal, a chipset, or a base station. The base station may notify the terminal of at least one of a time resource operating as full duplex or a time resource operating as half duplex. In addition, the base station may also notify the location of each frequency resource operating as a downlink or uplink. On the basis of such information, the terminal can identify the frequency resources that should and should not be used according to the time resource.

15 Claims, 30 Drawing Sheets

(56) References Cited

U.S. PATENT DOCUMENTS

| | | | | |
|---|---|---|---|---|
| 2020/0235980 | A1 | 7/2020 | Wilson et al. | |
| 2022/0052734 | A1* | 2/2022 | Faxer | H04B 7/0478 |
| 2022/0296597 | A1* | 9/2022 | Satyal | A61K 9/2054 |
| 2022/0338293 | A1* | 10/2022 | Yu | H04W 72/044 |

OTHER PUBLICATIONS

International Search Report and Written Opinion in International Appln. No. PCT/KR2022/010211, mailed on Oct. 11, 2022, 12 pages (with English translation).
RAN Vice-Chair (CMCC), "Email discussion summary for [RAN-R18-WS-crossFunc-Overall]", 3GPP TSG RAN Rel-18 workshop, RWS-210656, Electronic meeting, Jun. 28-Jul. 2, 2021, 71 pages.
Ericsson, "Correction to SON features," R2-2008286, 3GPP TSG-RAN2 Meeting #111 electronic, Online, Aug. 17-28, 2020, 887 pages.
Extended European Search Report in European Appln. No. 22842457.8, mailed on May 27, 2025, 9 pages.

* cited by examiner (a)

Carrier #0
Subband-wise Full Duplex (b)

Carrier #0
Spectrum-Sharing Full Duplex (a)

(b)

(a)

(b)

(b)

(b)

(a)

(b)

METHOD FOR OPERATING TERMINAL IN WIRELESS COMMUNICATION SYSTEM, AND DEVICE USING SAME

CROSS-REFERENCE TO RELATED APPLICATIONS

This application is a National Stage application under 35 U.S.C. § 371 of International Application No. PCT/KR2022/010211, filed on Jul. 13, 2022, which claims the benefit of Korean Patent Application No. 10-2021-0091296, filed on Jul. 13, 2021. The disclosures of the prior applications are incorporated by reference in their entirety.

TECHNICAL FIELD

This disclosure relates to a method of operating a user equipment (UE) in a wireless communication system and an apparatus using the method.

BACKGROUND

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, the UE is provided with uplink/downlink (UL/DL) resource configuration for a specific cell. UL/DL resource configurations provide information on whether a specific time resource is used as DL or UL, and are configured as semi-static configurations.

Additionally, the time resource, set as flexible (hereinafter abbreviated as F) by the semi-static configuration as above, can be used in DL or UL through dynamic scheduling by DL/UL grant or slot format indication by DCI format 2_0.

In the case of these existing UL/DL resource configurations, the resource type (i.e., DL, UL, F) in the time resource is notified for a specific cell. When a resource type is set for a specific time resource, the UE assumes that the resource type is applied equally to all frequency resources of the time resource.

Meanwhile, in NR, a full duplex (FD) operation can be performed, and when performing an FD operation, the resource type may be different depending on the frequency resource for the same time resource. For example, for a specific time resource, some frequency resources may be downlink resources and other frequency resources may be uplink resources.

Assuming that the base station operates in full duplex and the UE operates in half duplex (HD), the UE performs only one of DL and UL operations in a specific time resource. In this case, the base station should perform configuration/scheduling to prevent the UE from performing transmission/reception through a frequency resource operating with a resource type different from the resource type set to the UE for the specific time resource.

SUMMARY

The technical problem that the present disclosure aims to solve is to provide a method of operating a UE in a wireless communication system and an apparatus that uses the method.

In one aspect, provided is a method of operating a user equipment (UE) in a wireless communication system. The method includes receiving a first message determining a cell-specific uplink-downlink time division duplex (TDD) configuration and a second message determining a UE-specific uplink-downlink time division duplex (TDD) configuration, obtaining, via at least one of the first message and the second message, at least one of first time resource information and second time resource information. The first time resource information informs a first time resource for which a base station is operating in half duplex (HD) and the second time resource information informs a second time resource for which the base station is operating in full duplex (FD). And the method includes obtaining, via at least one of the first message and the second message, first frequency resource information for a first frequency resource and second frequency resource information for a second frequency resource. The UE determines, based on at least one of the first time resource information and the second time resource information, whether a specific time resource corresponds to one of the first time resource and the second time resource, and performs downlink reception or uplink transmission using distinct frequency resources depending on whether the specific time resource corresponds to the first time resource or the second time resource.

In another aspect, provided is a user equipment (UE). The UE includes a transceiver, at least one memory and at least one processor operably coupled to the at least one memory and the transceiver. The processor performs the above-described UE operation method.

In still another aspect, provided is an apparatus of a UE. The apparatus includes at least one memory and at least one processor operably coupled to the at least one memory. The processor performs the above-described UE operation method based at least in part on instructions stored in the memory.

In still another aspect, provided is at least one computer readable medium (CRM) having instructions to be executed by at least one processor. The CRM performs each step of the above-described UE operation method.

In still another aspect, provided is a method of operating a base station in a wireless communication system. The method includes transmitting a first message determining a cell-specific uplink-downlink time division duplex (TDD) configuration to a user equipment (UE), the first message including a reference subcarrier spacing and pattern information, the reference subcarrier spacing being used to determine a time domain boundary in an uplink-downlink pattern, and the pattern information including a periodicity of a downlink-uplink pattern, number of consecutive downlink slots at a beginning of the downlink-uplink pattern, number of consecutive downlink symbols in a beginning of a slot following a last slot of the consecutive downlink slots, number of consecutive uplink slots at an end of the downlink-uplink pattern, and number of consecutive uplink symbols at an end of a slot preceding a first slot of the consecutive uplink slots, transmitting a second message determining a UE-specific uplink-downlink time division duplex (TDD) configuration to the UE, the second message including a slot index and information informing whether each symbol in a slot identified by the slot index corresponds to a downlink symbol, an uplink symbol, or a flexible symbol, providing to the UE, via at least one of the first message and the second message, at least one of first time resource information and second time resource information, the first time resource information informing a first time resource for which the base station is operating in half duplex (HD) and the second time resource information informing a second time resource for which the base station is operating in full duplex (FD), providing to the UE, via at least one of the first time resource information and the second time resource information, first frequency resource information for a first frequency resource and second frequency resource information for a second frequency resource, performing downlink transmission on frequency resources constituting a downlink bandwidth (DL BWP) or uplink reception on frequency resources constituting an uplink bandwidth based on specific time resource corresponding to the first time resource, and performing downlink transmission on the first frequency resource among frequency resources constituting the downlink bandwidth (DL BWP) or uplink reception on the second frequency resource among frequency resources constituting the uplink bandwidth based on the specific time resource corresponding to the second time resource.

In still another aspect, provided is a base station (BS). The BS includes a transceiver, at least one memory and at least one processor operably coupled to the at least one memory and the transceiver. The processor performs the above-described base station operating method.

Even in a situation where the base station operates in full duplex and the UE operates in half duplex, the UE can accurately determine uplink/downlink resources. Therefore, unnecessary interference can be prevented and communication efficiency can be increased.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
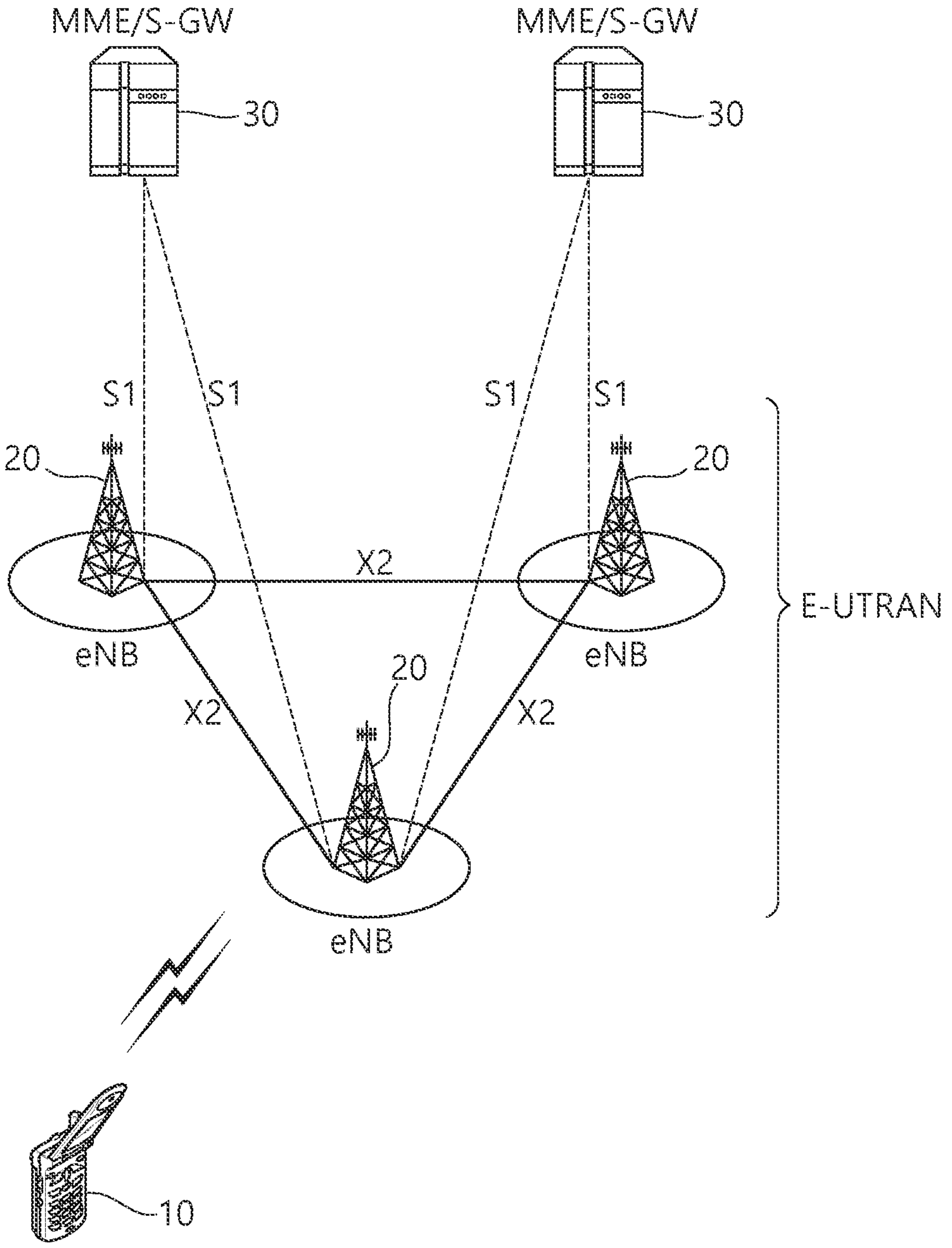
FIG. 1 illustrates a wireless communication system to which the present disclosure can be applied.

FIG. 1 illustrates a wireless communication system to which the present disclosure can be applied. This may also be called E-UTRAN (Evolved-UMTS Terrestrial Radio Access Network), or LTE (Long Term Evolution)/LTE-A system.

The E-UTRAN includes a base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal etc. The BS 20 is generally a fixed station that communicates with the UE 10 and may be referred to as another terminology, such as an evolved node-B (eNB), a base transceiver system (BTS), an access point, etc.

The BSs are interconnected by means of an X2 interface. The BSs are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
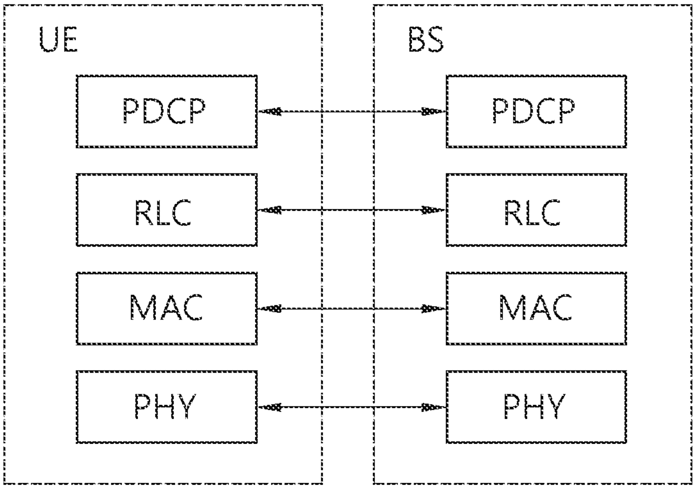
FIG. 2 is a block diagram showing the radio protocol architecture for the user plane.
Figure 3:
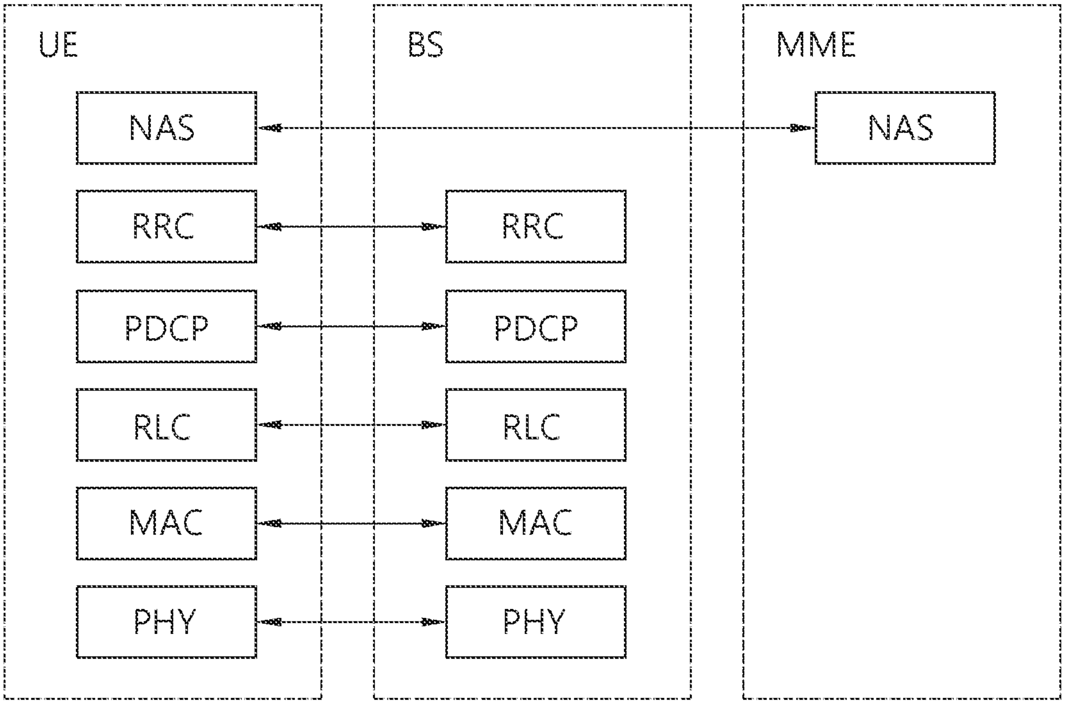
FIG. 3 is a block diagram showing the radio protocol structure for the control plane.

FIG. 2 is a block diagram showing the radio protocol architecture for the user plane. FIG. 3 is a block diagram showing the radio protocol structure for the control plane. The user plane is a protocol stack for user data transmission. The control plane is a protocol stack for control signal transmission.

Referring to FIG. 2 and FIG. 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new RAT or NR in the present disclosure for convenience.

Figure 4:
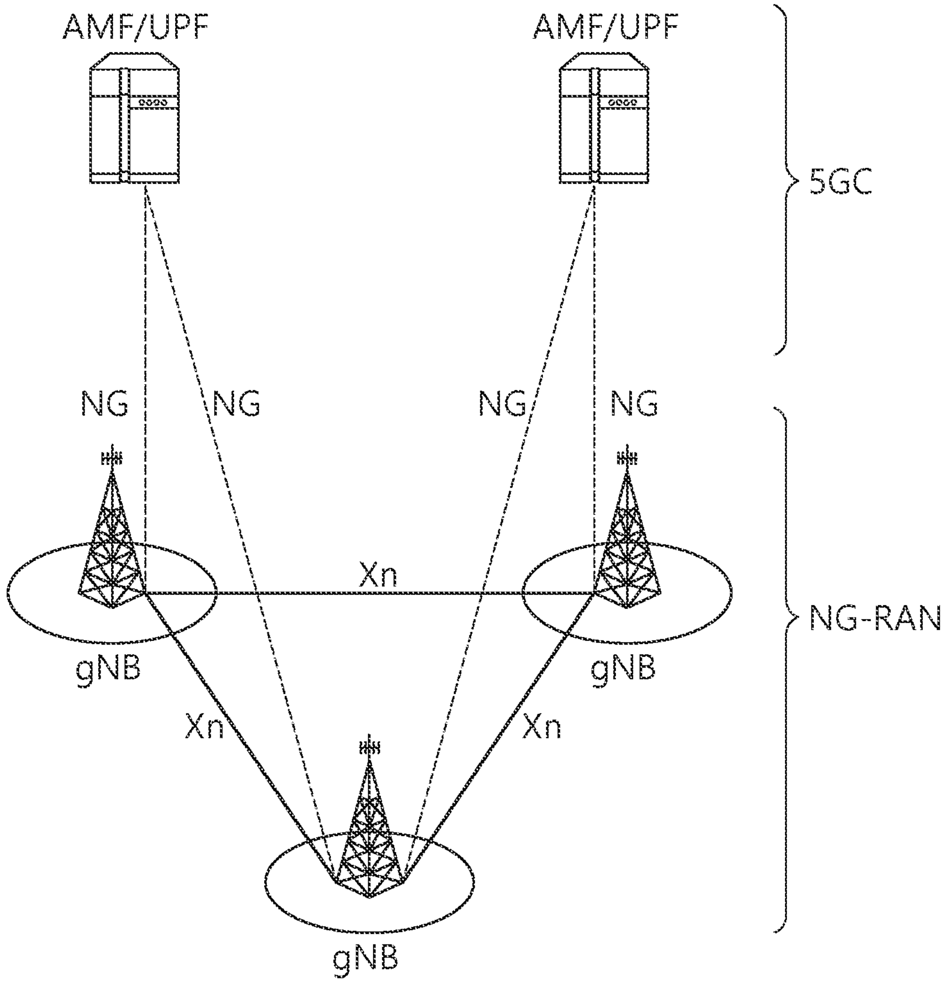
FIG. 4 illustrates the system structure of a next-generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNBs (eNBs) are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
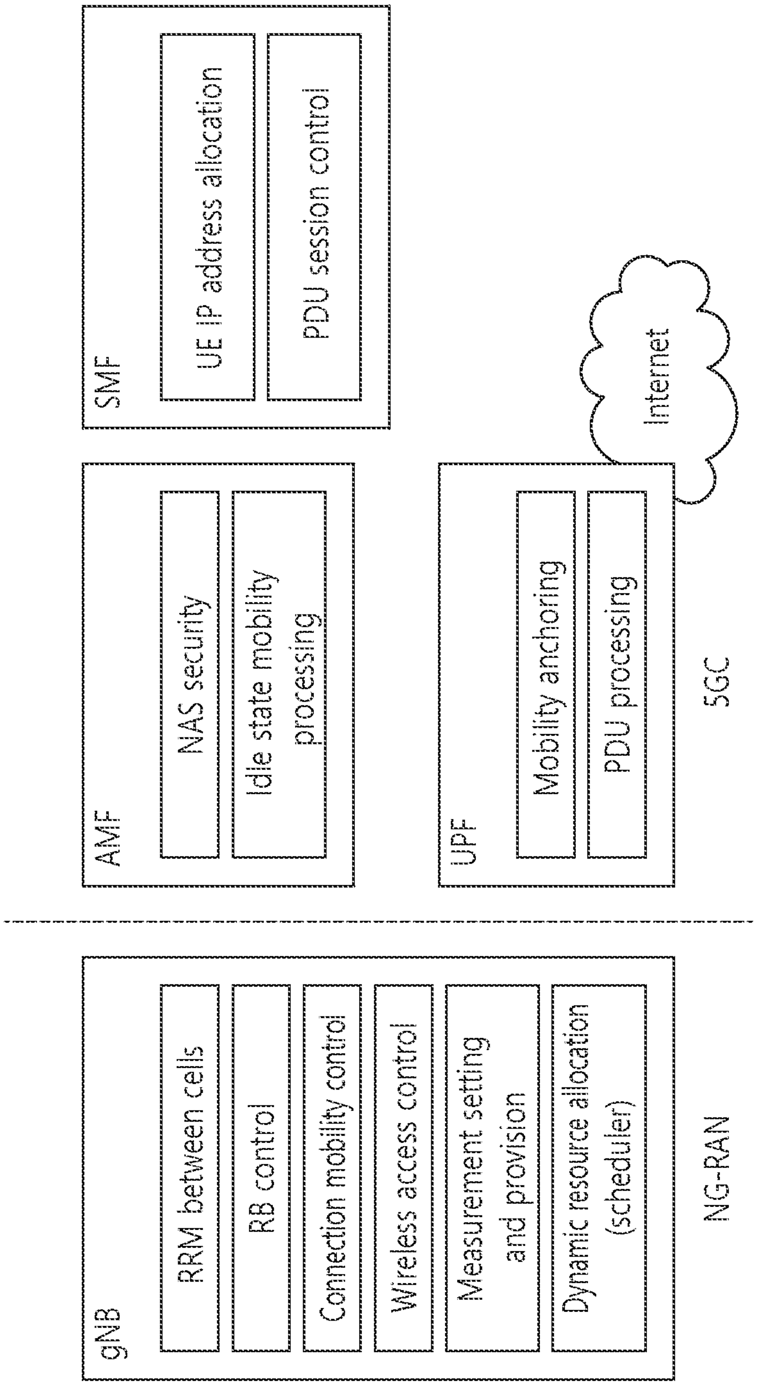
FIG. 5 illustrates the functional division between NG-RAN and 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
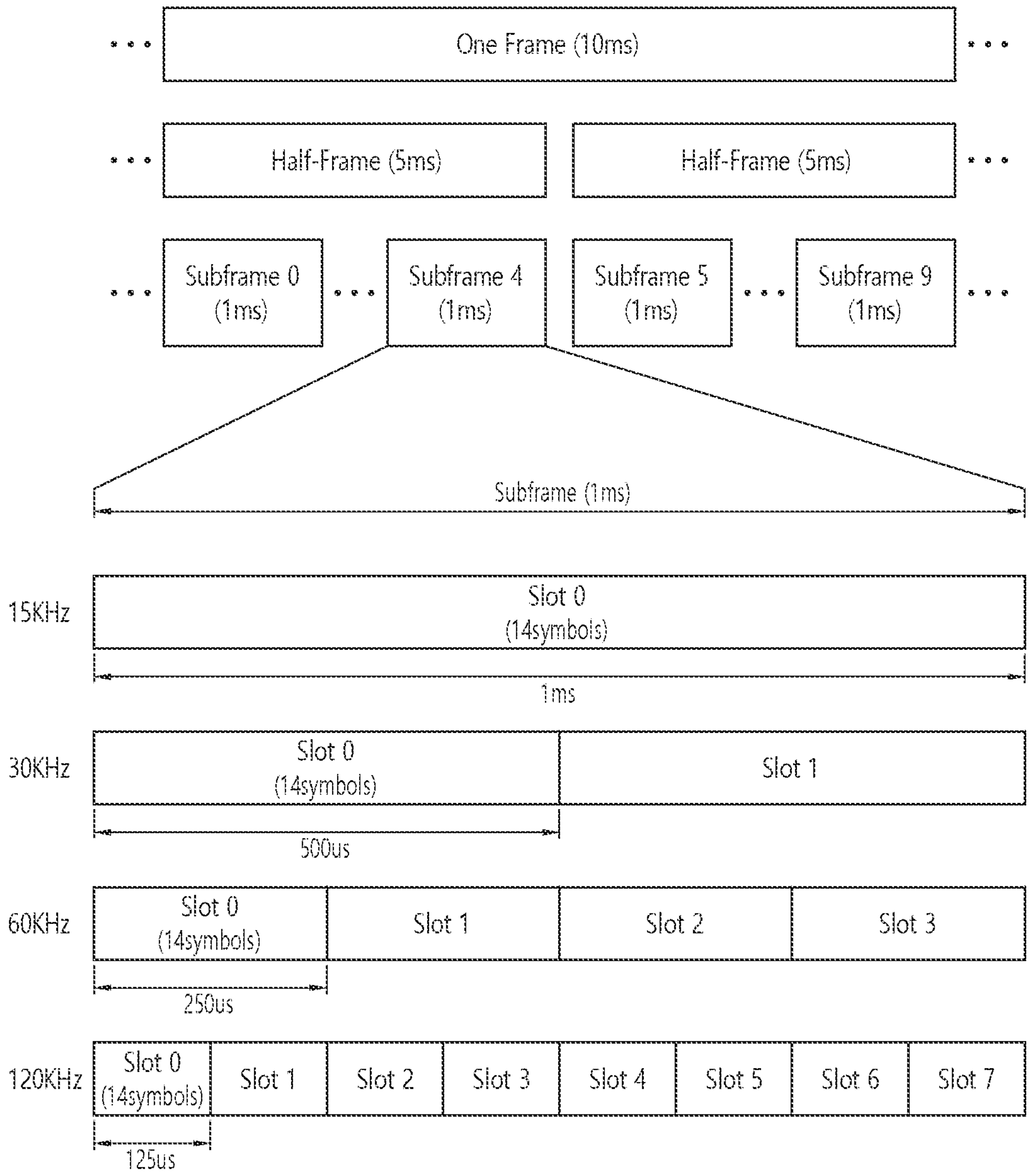
FIG. 6 illustrates a frame structure that can be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM (A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration μ.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM (A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
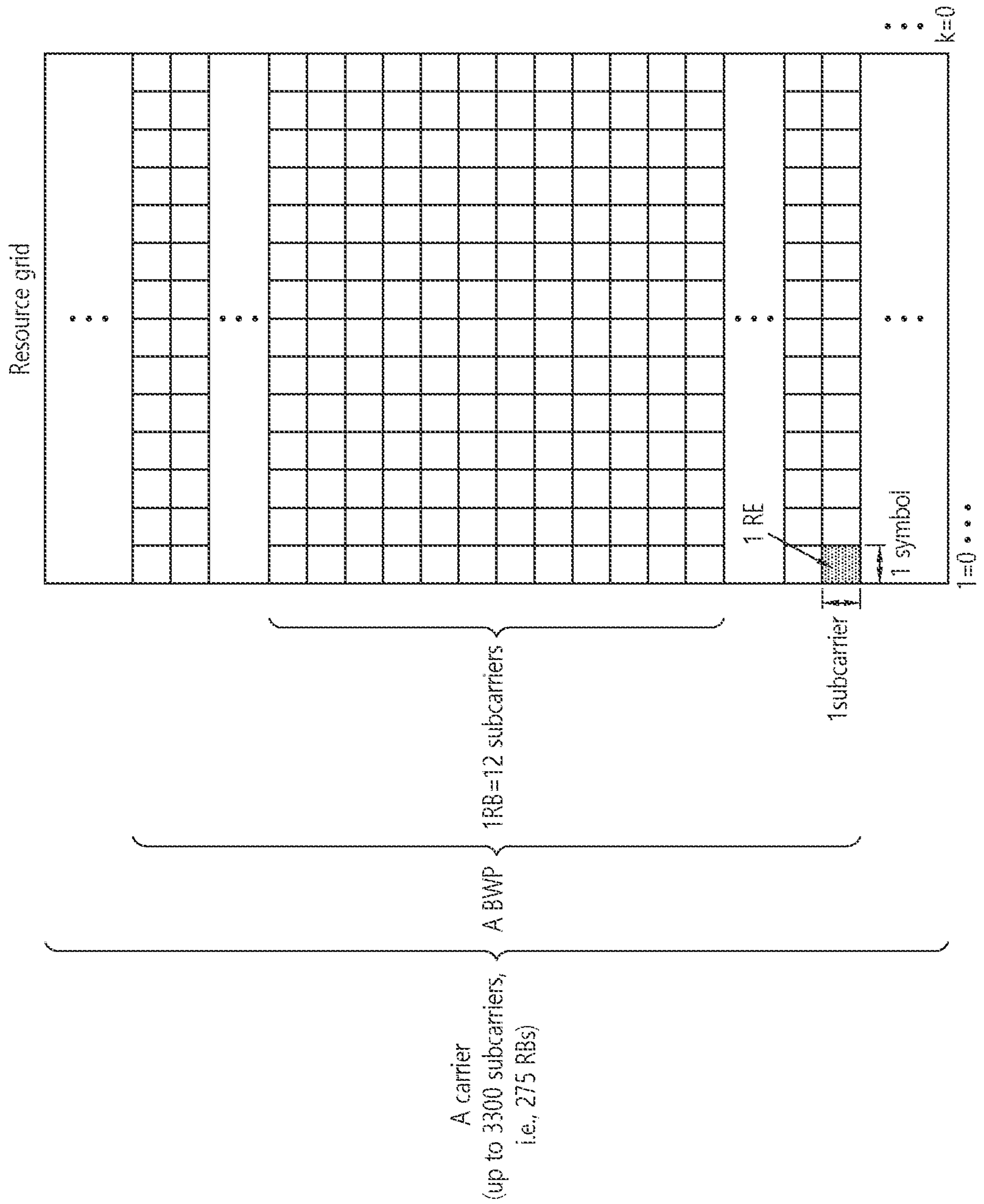
FIG. 7 illustrates the slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an active BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
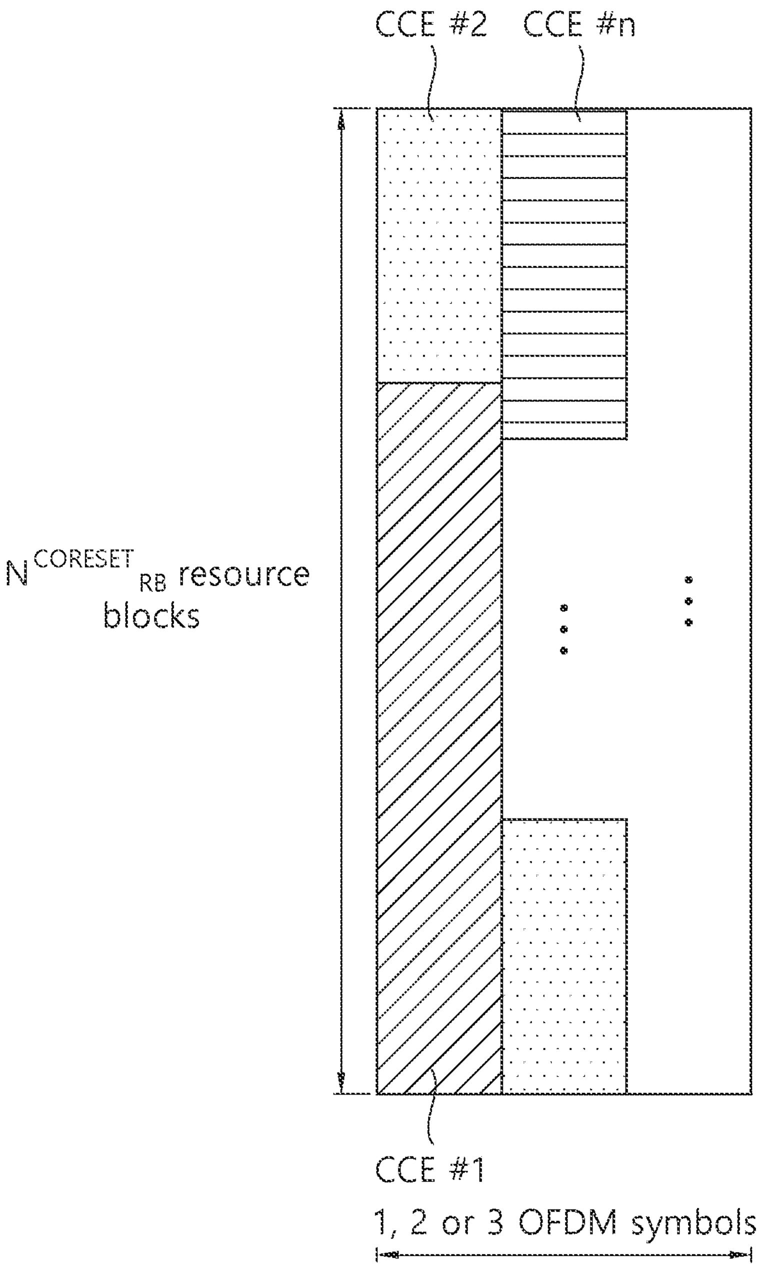
FIG. 8 illustrates the CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced CORESET is radio resources for control information to be received by the UE and may use only a portion, rather than the entirety of the system bandwidth. The BS may allocate the CORESET to each UE and may transmit control information through the allocated CORESET. In the NR, the UE may receive control information from the BS, without necessarily receiving the entire system band.

The CORESET may include a UE-specific CORESET for transmitting UE-specific control information and a common CORESET for transmitting control information common to all UEs.

On the other hand, NR may require high reliability depending on the application field. In this situation, the target block error rate (BLER) for downlink control information (DCI) transmitted through a downlink control channel (e.g., physical downlink control channel: PDCCH) may be significantly lower than that of the prior art. As an example of a method to satisfy the requirement for such high reliability, the amount of content included in DCI can be reduced and/or the amount of resources used when transmitting DCI can be increased. At this time, the resources may include at least one of resources in the time domain, resources in the frequency domain, resources in the code domain, and resources in the spatial domain.

In NR, the following technologies/features can be applied.

<Self-Contained Subframe Structure>

Figure 9:
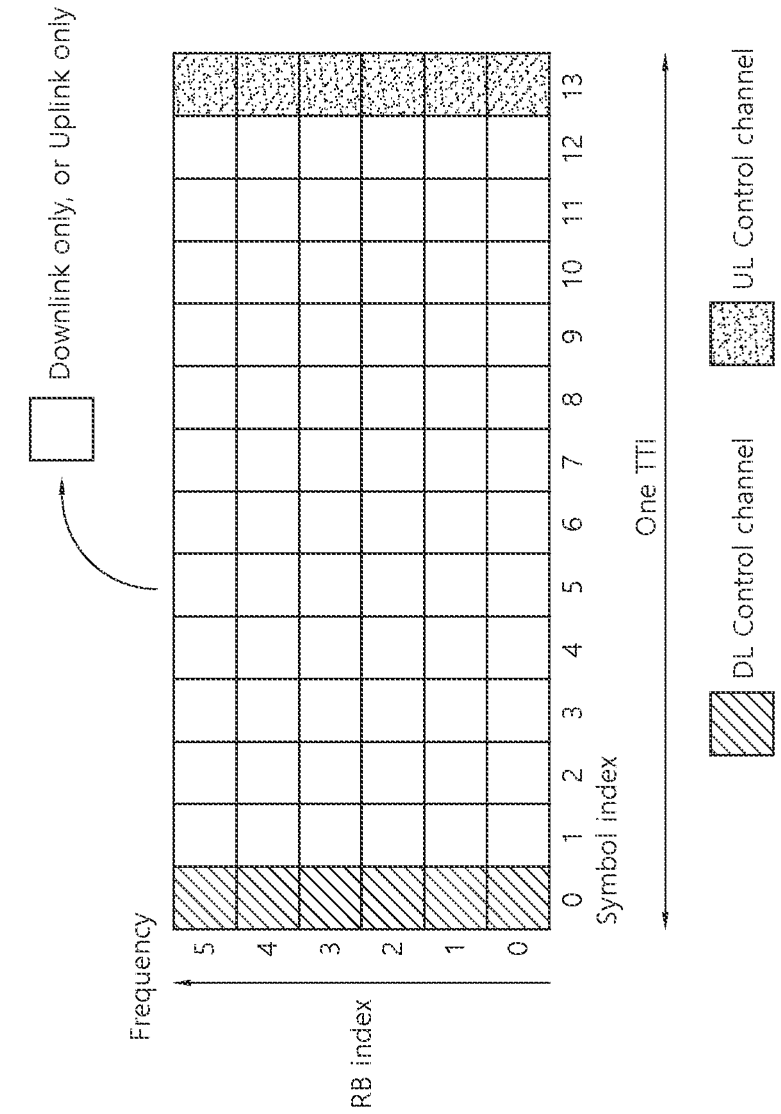
FIG. 9 shows an example of a frame structure for a new wireless access technology.

FIG. 9 shows an example of a frame structure for a new wireless access technology.

In NR, as shown in FIG. 9, a structure in which a control channel and a data channel are time-division-multiplexed within one TTI can be considered as a frame structure in order to minimize latency.

In FIG. 9, the hatched area represents the downlink control area, and the black portion represents the uplink control area. An unmarked area may be used for transmitting downlink data (DL data) or may be used for transmitting uplink data (UL data). The characteristic of this structure is that downlink (DL) transmission and uplink (UL) transmission proceed sequentially within one subframe. DL data can be sent within a subframe and UL ACK/NACK (Acknowledgement/Not-acknowledgement) can also be received. As a result, the time it takes to retransmit data when a data transmission error occurs is reduced, thereby minimizing the latency of final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 10:
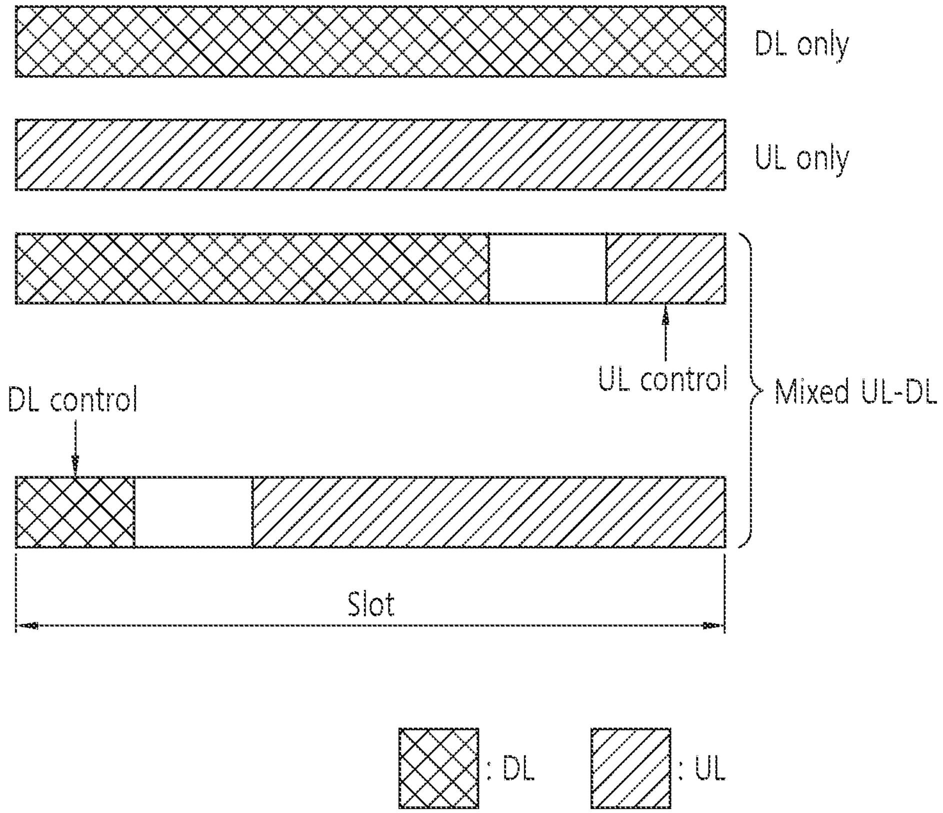
FIG. 10 illustrates the structure of a self-contained slot.

FIG. 10 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration,
2. UL only configuration,
3. Mixed UL-DL configuration:

DL region+Guard period (GP)+UL control region,

DL control region+GP+UL region.

DL region: (i) DL data region, (ii) DL control region+DL data region.

UL region: (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

Analog Beamforming #1

Wavelengths are shortened in millimeter wave (mmW) and thus a large number of antenna elements can be installed in the same area. That is, the wavelength is 1 cm at 30 GHZ and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell),
2) PDCCH DM-RS scrambling sequence initialization value,
3) Duration of a CORESET in the time domain (which may be given in symbol units),
4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
|---|---|
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 11:
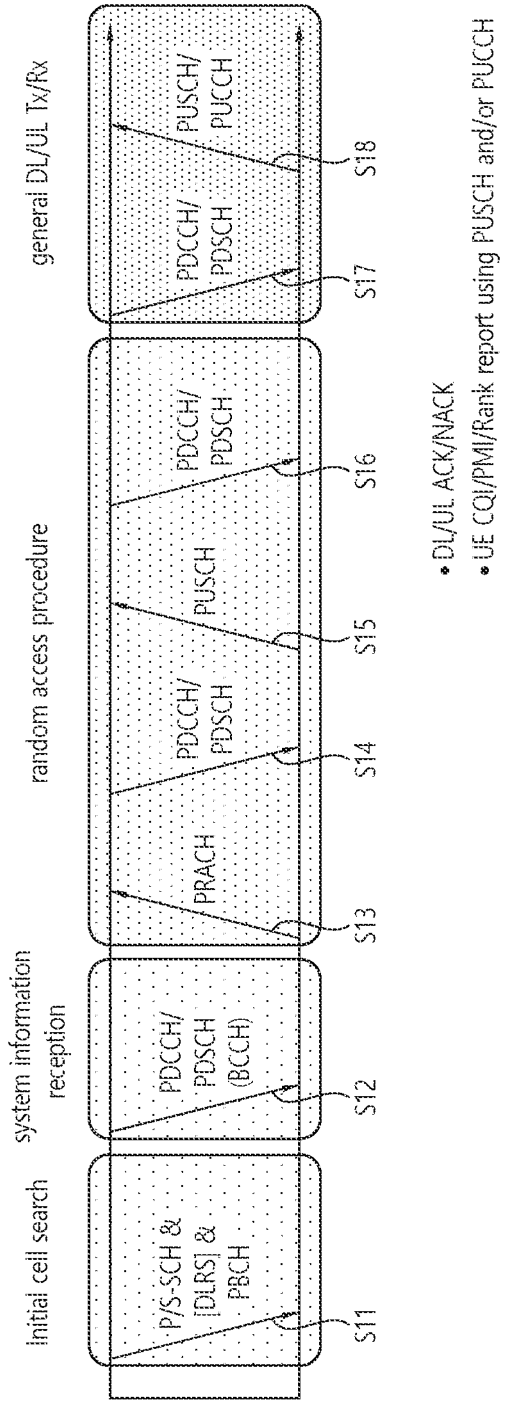
FIG. 11 illustrates physical channels and typical signal transmission.

FIG. 11 illustrates physical channels and typical signal transmission.

Referring to FIG. 11, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

This disclosure defines the following.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

When relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features described individually in one drawing in this specification may be implemented individually or simultaneously.

The following drawings were prepared to explain a specific example of the present specification. Since the names of specific devices or specific signals/messages/fields described in the drawings are provided as examples, the technical features of this specification are not limited to the specific names used in the drawings below.

Now, full duplex operation for NR will be described.

In 5G, new service types such as extended reality (XR), artificial intelligence-based service, and self-driving car are emerging. These services have characteristics that dynamically change traffic in both downlink (DL) and uplink (UL) directions, and require low latency for traffic (e.g., packets) to be transmitted. In 5G services, traffic will increase explosively to support these various new use cases.

Existing semi-static or dynamic TDD UL/DL configurations have limitations such as transmission time delay and interference between operators. The existing FDD method has limitations in terms of efficient frequency resource utilization in the DL/UL direction. Therefore, for low latency and efficient resource utilization in NR, the introduction of full duplex operation within a single carrier is being discussed.

Figure 12:
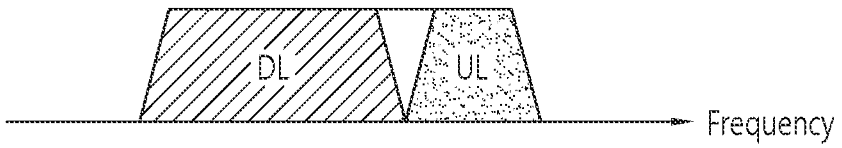
FIG. 12 shows examples of how to apply full duplex within an intra-carrier.
Figure 12:
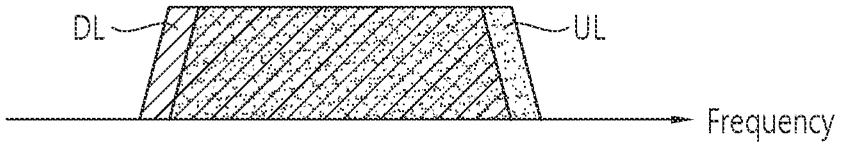

FIG. 12 shows examples of how to apply full duplex within an intra-carrier.

Referring to FIG. 12, the full duplex method includes subband-wise full duplex (hereinafter referred to as SB-FD) as shown in (a) of FIG. 12 and spectrum sharing full duplex (hereinafter referred to as SS-FD as shown in (b) of FIG. 12 may be considered.

In the case of SB-FD, DL and UL are transmitted and received through different frequency resources within the same carrier (e.g., carrier #0). That is, different frequency resources are used in DL and UL for the same time resource.

In the case of SS-FD, DL and UL are transmitted and received through the same or overlapped frequency resources within the same carrier (e.g., carrier #0). That is, the same or overlapping frequency resources can be used in DL and UL for the same time resource.

This full-duplex (FD) operation can also be used in combination with the existing half-duplex (HD) operation. For example, among time resources used for existing half-duplex-based TDD operation, some time resources may be used for full duplex operation. SB-FD or SS-FD operations can be performed on time resources that perform full duplex operations.

Figure 13:
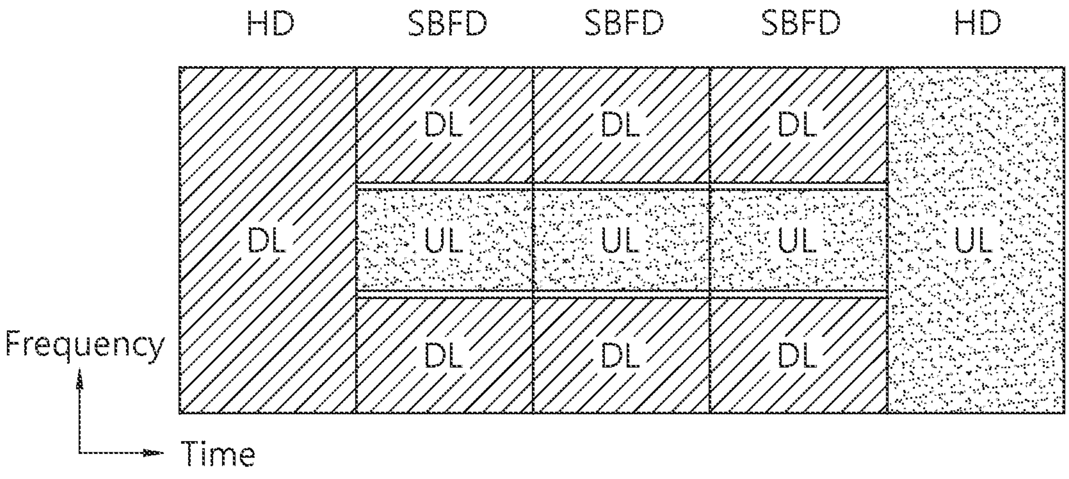
FIG. 13 shows an example in which a time resource operating in half duplex (HD) and a time resource operating in full duplex (FD) such as SB-FD or SS-FD exist together.
Figure 13:
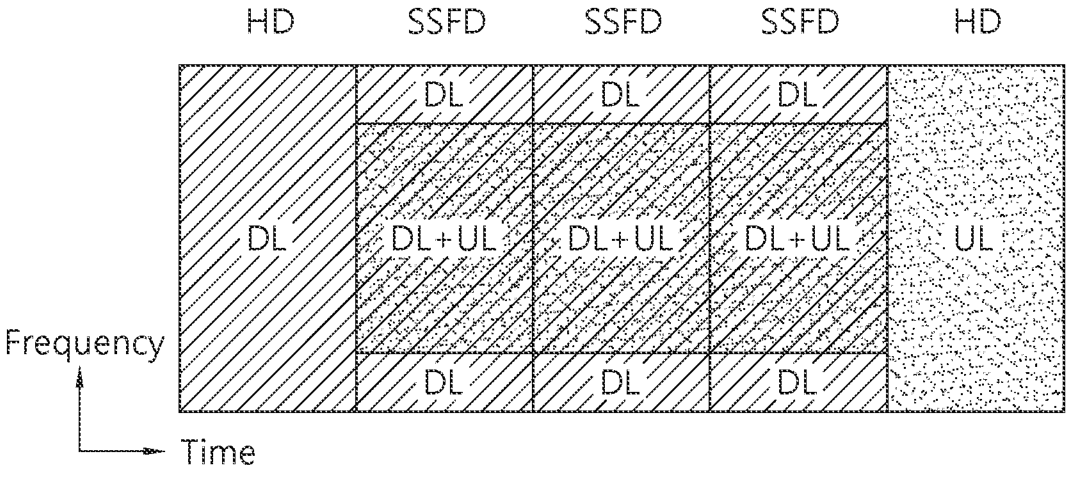

FIG. 13 shows an example in which a time resource operating in half duplex (HD) and a time resource operating in full duplex (FD) such as SB-FD or SS-FD exist together.

In (a) of FIG. 13, some time resources operating as SB-FD (=SBFD) are indicated as SBFD, and time resources operating as HD are indicated as HD. In (b) of FIG. 13, some time resources operating as SS-FD (=SSFD) are indicated as SSFD, and time resources operating as HD are indicated as HD. The unit of time resource may be, for example, a slot or symbol.

In time resources operating as SB-FD, some frequency resources are used as DL resources, and other frequency resources are used as UL resources. Between the DL frequency resource and the UL frequency resource, there may be a guard sub-band that is unused and empty for both DL and UL. Guard subbands may also be referred to by other terms, such as guard frequency resources or guard subcarrier(s). The guard subband is explained in more detail in FIG. 18.

In time resources operating with SS-FD, the entire frequency resource can be used for both DL and UL. Or, to reduce the impact of interference from other adjacent carriers (this may be referred to as ACI (adjacent carrier interference)), Some frequency resources at one or both ends of the carrier may not be used for DL and/or UL. That is, one or both ends of the carrier can be used as an unused guard band (guard subband) for both DL and UL. Alternatively, to reduce ACI on UL reception, one or both ends of the carrier may be used only for DL transmission.

In the present disclosure, in time resources operating in FD, among all frequency resources, frequency resources operating in DL are referred to as DL subbands, and frequency resources operating in UL are also referred to as UL subbands.

In the case of full duplex operation, both the base station and the UE can perform full duplex operation. That is, both the base station and the UE can simultaneously perform DL and UL transmission and reception using the same or different frequency resources in the same time resource.

Alternatively, only the base station can perform full duplex operation and the UE can perform half duplex operation. The base station can simultaneously perform transmission and reception of DL and UL using the same or different frequency resources in the same time resource, but the UE only performs DL reception or UL transmission in a specific time resource. In this case, the base station performs full duplex operation by performing DL transmission and UL reception with different UEs at the same time.

The content of the present disclosure is described assuming that the base station performs a full duplex operation, but the UE performs a half duplex operation. However, the content of the present disclosure can be applied even when both the base station and the UE perform full duplex operation.

Based on this discussion, this disclosure proposes a method for configuring DL and UL resources for intra-carrier full duplex operation.

In existing NR (e.g., 3GPP Rel-15/16), the UE is provided with UL/DL resource configuration for a specific cell. UL/DL resource configurations provide information on whether a specific time resource is used as DL or UL, and are configured semi-statically. Specifically, a specific time resource is set to one of the resource types of DL (downlink), UL (uplink), or F (flexible) by the following UL/DL resource configurations.

1) 'TDD-UL-DL-ConfigCommon'

2) 'TDD-UL-DL-ConfigDedicated'

Additionally, the time resource set as flexible (F), by the semi-static configuration as above, can be used in DL or UL through dynamic scheduling by DL/UL grant or slot format indication by DCI format 2_0.

In the case of existing UL/DL resource configurations, the resource type (i.e., DL, UL, F) in the time resource is notified for a specific cell. When a resource type is set for a specific time resource, the UE assumes that the resource type is applied equally to all frequency resources of the specific time resource. However, when performing FD operations such as SB-FD and SS-FD, the resource type may be different depending on the frequency resource for the same time resource.

In performing FD operations such as SB-FD and SS-FD, assuming that the base station operates in full duplex and the UE operates in half duplex, the UE performs only one of DL and UL operations in a specific time resource. Therefore, just by using existing resource configurations that inform the UE of the resource type applied in a specific time resource, the base station can inform the UE of the operation that the UE should perform in that time resource, and the UE can determine the operation that it should perform. However, the network should perform configuration/scheduling correctly so that the UE does not transmit or receive through frequency resources that operate with a resource type different from the resource type set to the UE for a specific time resource. For example, the UE should not perform UL transmission on frequency resources operated by the cell as DL, or the UE should not perform DL reception on frequency resources operated by the cell as UL.

A situation may arise where it is difficult to ensure that the UE operates through the correct frequency resource through existing BWP (bandwidth part) configurations and/or signal/channel configurations/scheduling, etc. In view of this, it may be helpful for the network to explicitly inform the UE of the location of FD-operated (or HD-operated) time resources and/or DL/UL-operated frequency resources during the uplink/downlink (UL/DL) resource setup phase. If the UE knows this information, it can operate more efficiently/effectively by switching bandwidth filtering, BWP, signal/channel transmission resources, power control methods, etc. based on time resources.

This disclosure proposes a method for a network to inform such information to a UE so that the UE can determine the location of a time resource operating in FD (or HD) and/or the location of a frequency resource operating in DL/UL.

Hereinafter, the network may be interpreted as being replaced with a base station or CU (Centralized Unit)/DU (Distributed Unit). Additionally, the UE may be interpreted as being replaced by the MT (mobile terminal) of the IAB node.

A. A method for Configuring Time/Frequency Resources for SB-FD and SS-FD Operation In this disclosure, it is assumed that a cell (base station) can operate in an FD method such as SB-FD or SS-FD, that is, it can perform both DL transmission and UL reception in the same time resource. For example, assume that a cell performs an HD operation in a first time resource and an FD operation in a second time resource (this may be any time resource other than the first time resource).

Through this operation, the network can vary the time resource for transmitting and receiving among the first time resource or the second time resource depending on the type of signal/channel being transmitted or received or the UE performing transmission and reception. For example, in the case of important signals/channels (e.g., SSB, PRACH) that should be less affected by interference and need to increase transmission/reception performance, resources are allocated so that transmission/reception can be performed only on the first time resource that operates only in half duplex. Through this, it is possible to maintain the transmission and reception performance of the corresponding signals/channels while applying full duplex to the cell. Or, when operating in full duplex on a second time resource, in the case of a UE in an environment in which proper transmission and reception cannot be performed due to the significant influence of CLI (cross link interference), by setting the resource to perform transmission and reception in the first time resource, transmission and reception performance for the corresponding UE can be guaranteed. CLI refers to interference between uplink and downlink.

Depending on time resources, the network and UE can operate as follows.

<Operation of Network and UE Related to Contents of This Disclosure>

In the time resources in which the cell performs HD operations, the UE can perform DL reception or UL transmission using all frequency resources constituting the DL BWP or UL BWP. On the other hand, in time resources where cells operate in FD mode such as SF-FD or SS-FD, the UE can perform DL reception or UL transmission only with limited frequency resources among the total frequency resources constituting the DL BWP or UL BWP.

To this end, the UE performs DL reception through all frequency resources for which the UE is configured to operate DL reception in the first time resource. On the other hand, in the second time resource, the UE performs DL reception through a first frequency resource that is more limited than the frequency resource through which the UE performs DL reception in the first time resource. In this case, even if DL reception is set for a frequency resource that does not correspond to the first frequency resource in the second time resource, the UE does not perform DL reception on a frequency resource that does not correspond to the first frequency resource.

In the first time resource, the UE performs UL transmission through all frequency resources set for the UE to operate UL transmission. On the other hand, in the second time resource, the UE performs UL transmission through a second frequency resource that is more limited than the frequency resources through which the UE performs UL transmission in the first time resource. In this case, even if UL transmission is configured for a frequency resource that does not correspond to the second frequency resource in the second time resource, the UE does not perform UL transmission in the frequency resource that does not correspond to the second frequency resource.

Through the above operation, the base station performs a half-duplex operation in which only DL transmission or UL reception is performed on the entire frequency resources constituting the cell in the first time resource, and in the second time resource, a full duplex operation can be performed in which DL transmission is performed through a first frequency resource within the frequency resource constituting the cell and simultaneously UL reception is performed through a second frequency resource within the frequency resource constituting the cell.

The above-described first time resource, second time resource, first frequency resource, and second frequency resource may have the following characteristics.

<Characteristics of the First Frequency Resource and the Second Frequency Resource>

The first frequency resource and the second frequency resource may have the following characteristics.

In the first time resource for performing the HD operation, the DL operation or UL operation is performed on all frequency resources constituting the entire system bandwidth (or all frequency resources constituting the allocated BWP). Within the first time resource performing the HD operation, the network performs the DL operation through the 1-1 time resource and the UL operation through the 1-2 time resource. At this time, the 1-1 time resource and the 1-2 time resource do not overlap with each other.

For the second time resource that performs the FD operation, the network performs DL operation using all or part of the frequency resources constituting the system band of the cell (or all or part of the frequency resources constituting the allocated BWP) (first frequency resource), and performs UL operation through some frequency resources (second frequency resource) other than all or part of the frequency resources.

Figure 14:
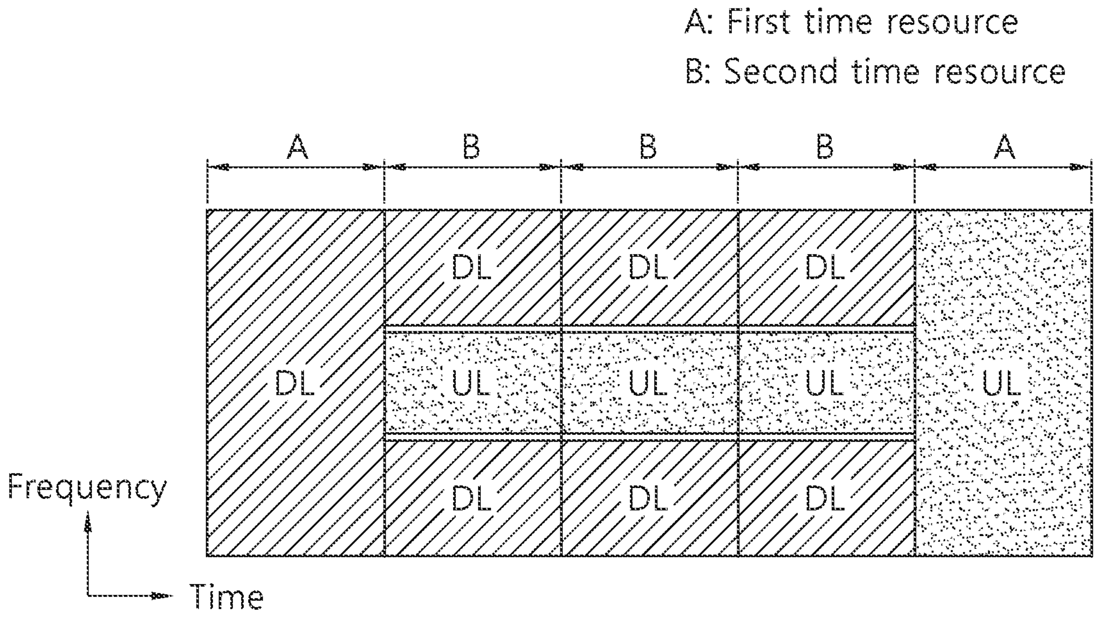
FIG. 14 shows examples of first time resource and second time resource, and examples of first frequency resource and second frequency resource.
Figure 14:
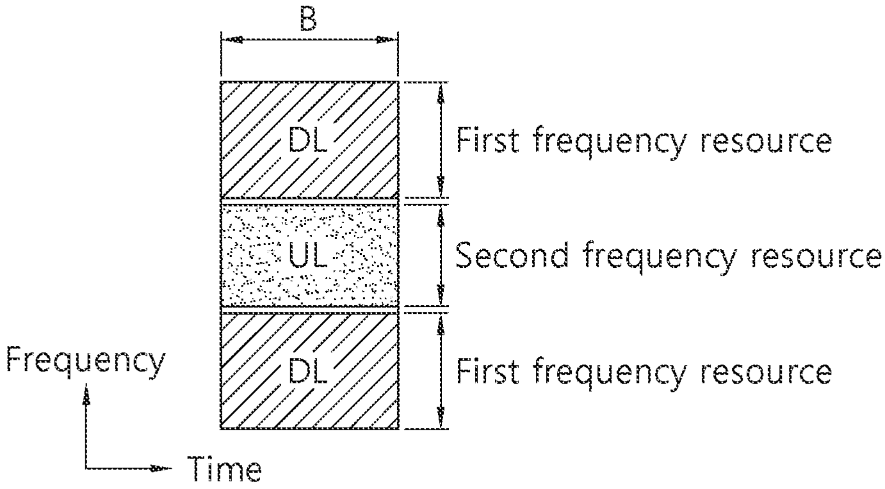

FIG. 14 shows examples of first time resource and second time resource, and examples of first frequency resource and second frequency resource.

Referring to (a) of FIG. 14, the first time resource (indicated by A) corresponds to a time resource operating in HD, and the second time resource (indicated by B) operates in FD (e.g., SB-FD). In the first time resource, the time resource indicated by DL corresponds to the 1-1 time resource, and the time resource indicated by UL corresponds to the 1-2 time resource.

(b) of FIG. 14 shows the second time resource, and the frequency resource operating as DL (indicated by DL) corresponds to the first frequency resource, and frequency resource operating in UL (indicated as UL) correspond to the second frequency resource.

Figure 15:
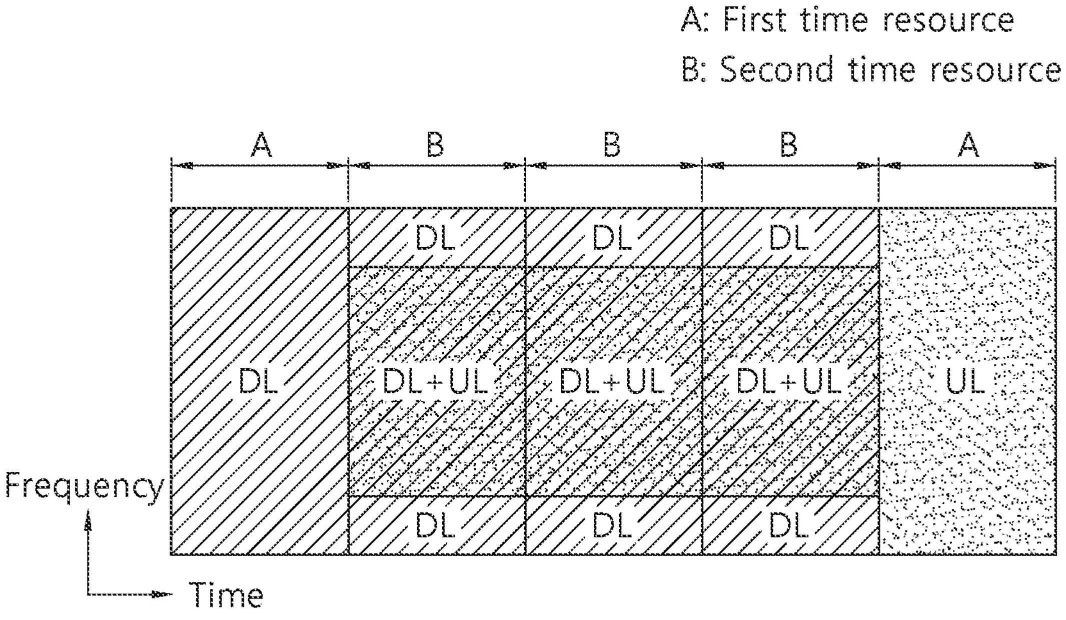
FIG. 15 shows another example of a first time resource and a second time resource, and another example of a first frequency resource and a second frequency resource.
Figure 15:
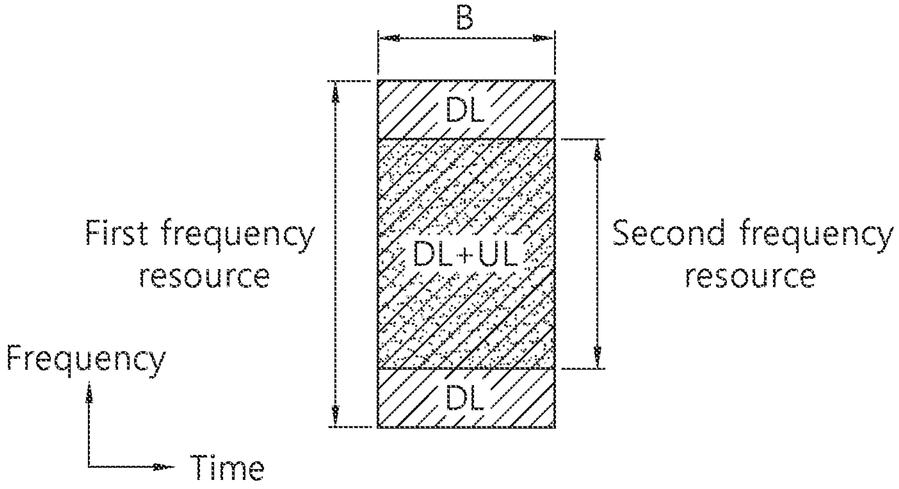

FIG. 15 shows another example of a first time resource and a second time resource, and another example of a first frequency resource and a second frequency resource.

Referring to (a) of FIG. 15, the first time resource (indicated by A) corresponds to a time resource operating in HD, and the second time resource (indicated by B) operates in FD (e.g., SS-FD). In the first time resource, the time resource indicated by DL corresponds to the 1-1 time resource, and the time resource indicated by UL corresponds to the 1-2 time resource.

(b) of FIG. 15 shows the second time resource, where the frequency resource operating in DL (indicated as DL) corresponds to the first frequency resource, and the frequency resource operating in UL corresponds to the second frequency resource. The frequency resource denoted as DL+UL is a frequency resource capable of both DL operation and UL operation and corresponds to both the first frequency resource and the second frequency resource.

More specifically, the first frequency resource and/or the second frequency resource may have all or some of the following characteristics.

1) When performing an SB-FD operation, the first frequency resource and the second frequency resource do not overlap with each other. This is to ensure that DL and UL resources are performed through different frequency resources. At this time, there may be frequency resources that do not correspond to the first and second frequency resource, and these frequency resources are called guard subbands or guard frequency resources. These guard frequency resources may be needed to reduce interference from DL transmission on UL reception. These guard frequency resources may be located between the first frequency resource and the second frequency resource.
2) When performing SS-FD operation, the first frequency resource and the second frequency resource may overlap. At this time, there may be frequency resources that do not correspond to the first and second frequency resources, and these frequency resources are called guard subbands or guard frequency resources. These guard frequency resources may be needed to reduce interference from DL transmission on adjacent carriers to UL reception and/or to reduce interference from DL transmission on UL reception on adjacent carriers.
3) When performing an SB-FD operation, the second frequency resource may be composed of continuous frequency resources, and the first frequency resource may be composed of discontinuous frequency resources. For example, the first frequency resource may be composed of a plurality (e.g., two) spaced apart frequency resource sets. At this time, each frequency resource set may be composed of consecutive frequency resources.

Alternatively, the first frequency resource may be composed of one frequency resource set, and at this time, the frequency resource set may be composed of continuous frequency resources, or may be composed of a plurality (for example, two) sets of continuous frequency resources.

That is, one or a plurality (for example, two) frequency resource set composed of consecutive frequency resources may be combined to form a first frequency resource. This is to reduce interference from DL transmission on adjacent carriers to UL resources by placing the second frequency resource used for UL at the center of the frequency resources constituting the cell.

Alternatively, the first frequency resource may be composed of continuous frequency resources, and the second frequency resource may be composed of discontinuous frequency resources. For example, the second frequency resource may be composed of a plurality (e.g., two) spaced apart frequency resource sets. At this time, each frequency resource set may be composed of consecutive frequency resources.

Alternatively, the second frequency resource may be composed of one frequency resource set, and in this case, the frequency resource set may be composed of consecutive frequency resources.

That is, one or more (for example, two) frequency resource sets composed of consecutive frequency resources can be combined to form a second frequency resource. This is to reduce interference from DL transmission on UL resources on adjacent carriers by placing the second frequency resource used for DL at the center of the frequency resources constituting the cell.

4) When performing SS-FD operation, the second frequency resource may be composed of some frequency resources of the first frequency resource. At this time, the second frequency resource may be configured to have fewer X physical resource blocks (PRBs) on one or both edges than the first frequency resource. This is to reduce interference from DL transmission on adjacent carriers to UL reception. Or, when performing SS-FD operation, the first frequency resource and the second frequency resource can be configured to have fewer X PRBs on one or both edges than the frequency resource used for DL and UL in the first time resource.

B. Method for Setting up Time Resources for SB-FD and SS-FD Operations

Below, proposed are a method for the UE to determine the first time resource and the second time resource and the configuration information that the network transmits to the UE for this purpose.

When performing FD operations such as SB-FD and SS-FD, assuming that the base station operates in full duplex and the UE operates in half duplex, the UE performs only one of DL and UL operations in a specific time resource. In this case, the UE receives UL/DL resource configuration information from the network as before and determines the DL/UL resource type to apply in a specific time resource, and may determine frequency resources for performing DL/UL operations by receiving DL/UL BWP information from the network.

When the network performs SB-FD or SS-FD operation, some of the frequency resources constituting the DL BWP set for the UE may correspond to second frequency resource used for UL operation. Alternatively, some of the frequency resources constituting the UL BWP set for the UE may correspond to the first frequency resource used for DL operation.

In this case, the network should properly perform DL configuration/scheduling to prevent the UE from performing DL reception on the second frequency resource included in the UE's DL BWP. Additionally, the network should properly perform DL configuration/scheduling to prevent the UE from performing UL transmission on the first frequency resource included in the UE's UL BWP. In other words, the UE should not perform UL transmission on frequency resources operated by the cell as DL, or the UE should not perform DL reception on frequency resources operated by the cell as UL.

However, operating to prevent the above problems from occurring only through network scheduling/setting may result in too much network burden. Considering that situations may arise where it is difficult to ensure that the UE operates through the correct frequency resource through existing BWP configurations and/or signal/channel configurations/scheduling, etc., it may be helpful to explicitly inform the UE of the location information of frequency resources operating in DL/UL. If the UE knows this information, the UE can operate more efficiently/effectively by switching bandwidth filtering, BWP, signal/channel transmission resources, power control method, etc. according to time resources.

To address these problems, it is necessary for the UE to know the second frequency resource that cannot perform DL transmission and/or determine the first frequency resource that cannot perform UL transmission, so that the UE does not perform DL reception on the second frequency resource and/or does not perform UL transmission on the first frequency resource on the second time resource.

To this end, the UE needs to know information about a second time resource that can perform transmission and reception only with limited frequency resources and/or information about a first time resource that can perform transmission and reception with unrestricted frequency resources.

To this end, this disclosure proposes a method for a UE to determine a first time resource and a second time resource, and configuration information that the network transmits to the UE for this purpose.

<Operation of Network and UE Related to Contents of This Disclosure>

The base station may perform half-duplex operation in which it performs only one of DL transmission or UL reception across the frequency resources comprising the cell in a first time resource, and full-duplex operation in which it performs DL transmission over the first frequency resource within the frequency resources comprising the cell in a second time resource and simultaneously performs UL reception over the second frequency resource within the frequency resources comprising the cell. To this end, the base station determines time resources corresponding to the first time resource and the second time resource and transmits configuration information regarding the first time resource and/or the second time resource to the UE.

The UE receives configuration information about the first time resource and/or the second time resource from the network and determines the locations of the first time resource and the second time resource. In this case, in the first time resource, the UE performs DL reception (UL transmission) over the entire frequency resource in which the UE is set to operate DL reception (UL transmission), and in the second time resource, the UE performs DL reception (UL transmission) over a first frequency resource (the second frequency resource) that is more limited than the frequency resource in which the UE performs DL reception (UL transmission) in the first time resource. In this case, the UE does not perform DL reception (UL transmission) on a frequency resource that does not correspond to the first frequency resource (second frequency resource) even if it is set to receive DL reception (UL transmission) on a frequency resource that does not correspond to the first frequency resource (second frequency resource) in the second time resource.

Figure 16:
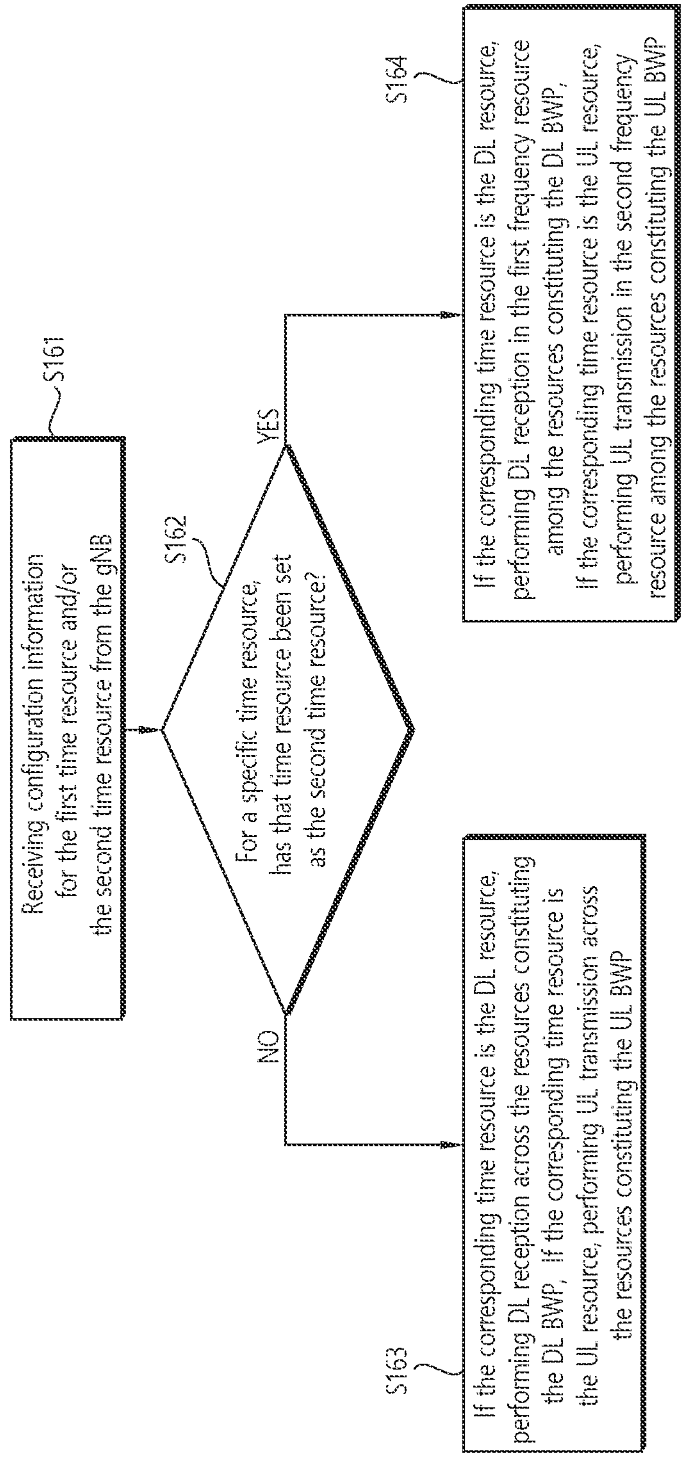
FIG. 16 is an example of the operation process of the UE.

FIG. 16 is an example of the operation process of the UE.

Referring to FIG. 16, the UE receives configuration information from the base station indicating whether a specific time resource is included in the first time resource and/or the second time resource (S161). The UE determines whether a specific time resource corresponds to the first time resource or the second time resource based on the configuration information (S162).

If the corresponding time resource is the first time resource (i.e., the corresponding time resource is not set to the second time resource), the UE may perform configured/scheduled DL reception across the resources constituting the DL BWP, provided that the corresponding time resource is a resource that is set to perform DL reception. If the corresponding time resource is a resource configured to perform UL transmission, configured/scheduled UL transmission can be performed across all resources constituting the UL BWP (S163).

If the corresponding time resource is a second time resource, the UE may perform the configured/scheduled DL reception within the frequency resource corresponding to the first frequency resource among the resources constituting the DL BWP, provided that the corresponding time resource is a resource set to perform DL reception. If the time resource is a resource set to perform UL transmission, the configured/scheduled UL transmission can be performed within the frequency resource corresponding to the second frequency resource among the resources constituting the UL BWP (S164).

In the following, more specific details of the configuration information regarding the first time resource and/or the second time resource, and a specific process by which the UE receives the configuration information and determines whether a specific time resource corresponds to the first time resource or the second time resource are proposed.

<Method for Configuring the Configuration Information of the First Time Resource and the Second Time Resource>

The following table illustrates TDD-UL-DL-ConfigCommon IE. TDD-UL-DL-ConfigCommon IE may be a message that determines cell-specific uplink-downlink time division duplex (TDD) configurations. TDD-UL-DL-ConfigCommon IE can be system information or RRC message. TDD-UL-DL-ConfigCommon IE may include reference subcarrier spacing and pattern information, the reference subcarrier spacing is used to determine a time domain boundary in an uplink-downlink pattern, and the pattern information includes a periodicity of a downlink-uplink pattern, the number of consecutive downlink slots at the beginning of the downlink-uplink pattern, the number of consecutive downlink symbols in the beginning of a slot following the last slot of the consecutive downlink slots, the number of consecutive uplink slots at the end of the downlink-uplink pattern, and the number of consecutive uplink symbols at the end of a slot preceding the first slot of the consecutive uplink slots.

TABLE 5

```
-- ASN1START
-- TAG-TDD-UL-DL-CONFIGCOMMON-START
TDD-UL-DL-ConfigCommon ::=              SEQUENCE {
  referenceSubcarrierSpacing             SubcarrierSpacing,
  pattern1                                 TDD-UL-DL-Pattern,
  pattern2                                                  TDD-UL-DL-Pattern
OPTIONAL, -- Need R
  . . .
}
TDD-UL-DL-Pattern ::=                   SEQUENCE {
  dl-UL-TransmissionPeriodicity             ENUMERATED {ms0p5, ms0p625, ms1,
ms1p25, ms2, ms2p5, ms5, ms10},
  nrofDownlinkSlots                        INTEGER (0..maxNrofSlots),
  nrofDownlinkSymbols                        INTEGER (0..maxNrofSymbols-1),
  nrofUplinkSlots                          INTEGER (0..maxNrofSlots),
  nrofUplinkSymbols                          INTEGER (0..maxNrofSymbols-1),
  . . . ,
  [[
  dl-UL-TransmissionPeriodicity-v1530              ENUMERATED {ms3, ms4}
OPTIONAL -- Need R
  ]]
}
-- TAG-TDD-UL-DL-CONFIGCOMMON-STOP
-- ASN1STOP
```

The following table illustrates TDD-UL-DL-ConfigDedicated IE. TDD-UL-DL-ConfigDedicated IE may be a message that determines UE-specific uplink-downlink TDD configurations. TDD-UL-DL-ConfigDedicated IE may be an RRC message. TDD-UL-DL-ConfigDedicated IE may include a slot index and information informing whether each symbol in a slot identified by the slot index corresponds to a downlink symbol, an uplink symbol, or a flexible symbol.

TABLE 6

```
-- ASN1START
-- TAG-TDD-UL-DL-CONFIGDEDICATED-START
TDD-UL-DL-ConfigDedicated ::=              SEQUENCE {
  slotSpecificConfigurationsToAddModList                SEQUENCE      (SIZE
(1..maxNrofSlots)) OF TDD-UL-DL-SlotConfig          OPTIONAL, -- Need N
  slotSpecificConfigurationsToReleaseList               SEQUENCE      (SIZE
(1..maxNrofSlots)) OF TDD-UL-DL-SlotIndex           OPTIONAL, -- Need N
  . . .
}
TDD-UL-DL-ConfigDedicated-IAB-MT-v16xy::=      SEQUENCE {
  slotSpecificConfigurationsToAddModList-IAB-MT-v16xy   SEQUENCE            (SIZE
(1..maxNrofSlots)) OF TDD-UL-DL-SlotConfig-IAB-MT-v16xy OPTIONAL, -- Need N
  slotSpecificConfigurationsToreleaseList-IAB-MT-v16xy   SEQUENCE           (SIZE
(1..maxNrofSlots)) OF TDD-UL-DL-SlotIndex   OPTIONAL, -- Need N
  . . .
}
TDD-UL-DL-SlotConfig ::=                  SEQUENCE {
  slotIndex                                  TDD-UL-DL-SlotIndex,
  symbols                                      CHOICE {
    allDownlink                                    NULL,
    allUplink                                    NULL,
```

TABLE 6-continued

```
      explicit                                    SEQUENCE {
        nrofDownlinkSymbols                                          INTEGER
(1..maxNrofSymbols-1)                                    OPTIONAL, -- Need S
        nrofUplinkSymbols                                            INTEGER
(1..maxNrofSymbols-1)                                      OPTIONAL -- Need
S
      }
    }
}
TDD-UL-DL-SlotConfig-IAB-MT-v16xy::=          SEQUENCE {
  slotIndex-r16                                 TDD-UL-DL-SlotIndex,
  symbols-IAB-MT-r16                              CHOICE {
    allDownlink-r16                                     NULL,
    allUplink-r16                                     NULL,
    explicit-r16                                    SEQUENCE {
      nrofDownlinkSymbols-r16                                        INTEGER
(1..maxNrofSymbols-1)                                OPTIONAL, -- Need FFS
      nrofUplinkSymbols-r16                                          INTEGER
(1..maxNrofSymbols-1)                                OPTIONAL -- Need FFS
    },
    explicit-IAB-MT-r16                           SEQUENCE {
      nrofDownlinkSymbols-r16                                        INTEGER
(1..maxNrofSymbols-1)                                OPTIONAL, -- Need FFS
      nrofUplinkSymbols-r16                                          INTEGER
(1..maxNrofSymbols-1)                                OPTIONAL -- Need FFS
    }
  }
}
TDD-UL-DL-SlotIndex ::=                     INTEGER (0..maxNrofSlots-1)
-- TAG-TDD-UL-DL-CONFIGDEDICATED-STOP
-- ASN1STOP
```

The following methods can be used in relation to setting and determining the first time resource information and/or the second time resource information. One of the following methods may be applied, or a plurality of methods may be applied in combination.

(a) The network can configure the UE with TDD-UL-DL-ConfigCommon IE, which is DL/UL information according to time resources commonly applied to all UEs in the cell. That is, the UE receives TDD-UL-DL-ConfigCommon IE from the network.

The UE may determine that the time resource set to DL or UL through TDD-UL-DL-ConfigCommon corresponds to the first time resource. This determination may be performed on a symbol or slot basis.

i) When determined on a symbol basis, the UE determines that the symbol resource set to DL or UL through TDD-UL-DL-ConfigCommon corresponds to the first time resource.

ii) When determined on a slot-by-slot basis, the UE determines that a slot in which all symbol resources in the slot are set to DL or UL through TDD-UL-DL-ConfigCommon corresponds to the first time resource. Alternatively, the UE determines that a slot in which at least one symbol resource in the slot is set to DL or UL through TDD-UL-DL-ConfigCommon corresponds to the first time resource.

In other words, the UE determines that time resources other than the second time resource determined as in (b) below correspond to the first time resource.

(b) The network sets the UE to TDD-UL-DL-ConfigCommon IE, which is DL/UL information according to time resources commonly applied to all UEs in the cell. The UE receives TDD-UL-DL-ConfigCommon IE from the network.

The UE determines that the time resource set to F through TDD-UL-DL-ConfigCommon corresponds to the second time resource. This determination may be performed on a symbol or slot basis.

i) When determined on a symbol basis, the UE determines that the symbol resource set to F through TDD-UL-DL-ConfigCommon corresponds to the second time resource.

ii) When determined on a slot-by-slot basis, the UE determines that a slot in which all symbol resources within the slot are set to F through TDD-UL-DL-ConfigCommon corresponds to the second time resource. Alternatively, the UE determines that a slot in which at least one symbol resource in the slot is set to F through TDD-UL-DL-ConfigCommon corresponds to the second time resource.

To express this differently, the UE determines that time resources other than the first time resource determined as in (a) above correspond to the second time resource.

(c) The network sets time information corresponding to the first time resource and/or time information corresponding to the second time resource to the UE. The UE receives time information corresponding to the first time resource and/or time information corresponding to the second time resource from the network. This time information can be set on a slot or symbol basis.

When the UE receives only information about the first time resource, the UE determines that the remaining time resources correspond to the second time resource. Alternatively, when the UE receives only information about the second time resource, the UE determines that the remaining time resources correspond to the first time resource.

This method can be applied only to time resources other than the first time resource determined as in (a) above, or only to the second time resource determined as in (b) above. That is, for a time resource that is not determined to be a first time by the method (a) above or a time resource that is determined to be a second time resource by the method (b), time information corresponding to the first time resource and/or time information corresponding to the second time resource is set, and from this, the UE can determine the locations of the first time resource and the second time resource.

This configuration information may be transmitted cell-specifically through system information (SI).

For example, time information corresponding to the first time resource and/or time information corresponding to the second time resource are set through TDD-UL-DL-Pattern of TDD-UL-DL-ConfigCommon IE. This configuration information may be repeated with a period of 'dl-UL-TransmissionPeriodicity'.

Characteristically, this configuration may only be applied to time resources that are not determined as first time by method (a) above or to time resources that are determined to be second time resource by method (b).

This configuration information can be performed on a symbol or slot basis. This configuration information can be transmitted UE-specifically through RRC.

Additionally/independently, in the case of a time resource corresponding to the second time resource, it can be set whether to perform the SB-FD operation or the SS-FD operation in the corresponding slot. These configurations are performed on a slot-by-slot basis, so whether to perform SB-FD operation or SS-FD operation can be set for each slot. Alternatively, these configurations may be commonly set and applied to the time resource set as the second time resource.

(d) The network sets the UE to TDD-UL-DL-ConfigDedicated IE, which is DL/UL information according to time resources that is UE-specifically applied to UEs in the cell. The UE receives TDD-UL-DL-ConfigDedicated IE from the network. The resource type (DL, UL, F) for the slot/symbol resource set to F through TDD-UL-DL-ConfigCommon is set UE-specifically through this TDD-UL-DL-ConfigDedicated.

Information on whether a specific time resource corresponds to the first time resource and/or the second time resource is transmitted through this TDD-UL-DL-ConfigDedicated IE. More specifically, the following methods can be used.

The resource type (DL, UL, F) for the symbols that make up a specific slot is set through TDD-UL-DL-ConfigDedicated IE. At this time, information on whether a specific slot corresponds to the first time resource or the second time resource is additionally set.

The following table illustrates a TDD-UL-DL-ConfigDedicated IE that includes information about whether a specific slot corresponds to a first time resource or a second time resource. That is, the contents of Table 7 can be included in the TDD-UL-DL-ConfigDedicated IE of Table 6.

TABLE 7

```
TDD-UL-DL-SlotConfig ::=        SEQUENCE {
  slotIndex                        TDD-UL-DL-SlotIndex,
  symbols                            CHOICE {
        allDownlink                        NULL,
        allUplink                        NULL,
        explicit                        SEQUENCE {
            nrofDownlinkSymbols                            INTEGER
(1..maxNrofSymbols-1)   OPTIONAL, -- Need S
            nrofUplinkSymbols                              INTEGER
(1..maxNrofSymbols-1)   OPTIONAL   -- Need S
        }
  }
     duplexType
     ENUMERATED {HD, FD}
}
```

As shown in the table above, 'duplexType' is added to TDD-UL-DL-SlotConfig of TDD-UL-DL-ConfigDedicated IE, and 'duplex Type' indicates whether the slot indicated by 'slotIndex' is an HD slot or an FD slot. HD means that the slot corresponds to the first time resource, and FD means that the slot corresponds to the second time resource.

The resource type (DL, UL, F) for the symbols that make up a specific slot is configured via TDD-UL-DL-ConfigDedicated IE. More specifically, one symbol resource configuration is selected among 'allDownlink', 'allUplink', and 'explicit' through 'symbols'. 'allDownlink' means that all symbol resources in the slot are configured as downlinks, 'allUplink' means that all symbol resources in the slot are configured as uplinks, and 'explicit' means that downlink, flexible, and/or uplink exist together in the slot. At this time, at least one of the following configurations can be added to the symbol resource configuration that can be set through 'symbols'.

i) 'allDownlink_FD': This means that all symbol resources in the slot are configured as downlink and belong to the second time resource operating as FD. This means that all symbol resources in the slot are configured as downlink, but can operate as downlink only for limited DL frequency resources (first frequency resource).

ii) 'allUplink_FD': This means that all symbol resources in the slot are configured as uplink and belong to the second time resource operating as FD. This means that all symbol resources in the slot are configured as uplink, but can operate as uplink only for limited UL frequency resources (second frequency resource).

iii) 'explicit_FD': This means that the symbol resource in the slot consists of downlink, flexible, and/or uplink, and belongs to the second time resource operating as FD. This means that all symbol resources in the slot are configured as downlink, but can operate in downlink only for limited DL frequency resources (first frequency resource) and uplink only for limited UL frequency resources (second frequency resource).

Additionally/independently, whether to perform SB-FD operation or SS-FD operation in a specific slot can be set through TDD-UL-DL-ConfigDedicated IE. More specifically, the following methods can be used.

1) Set the resource type (DL, UL, F) for the symbols that make up a specific slot through TDD-UL-DL-ConfigDedicated IE. At this time, a duplex type operating in a specific slot can be set. For this, for example, 'duplexType' is added to TDD-UL-DL-SlotConfig of TDD-UL-DL-ConfigDedicated IE, and the 'duplex Type' indicates whether HD operation, SS-FD operation, or SB-FD operation is performed in the slot indicated by 'slotindex'. At this time, in case of HD operation, this means that the slot corresponds to the first time resource, and in case of SB-FD or SS-FD operation, this means that the slot corresponds to the second time resource. Through this, the UE can determine the locations of the first time resource and the second time resource, and additionally, in the case of the second time resource, whether to perform the SB-FD operation or the SS-FD operation.

2) Set the resource type (DL, UL, F) for the symbols that make up a specific slot through TDD-UL-DL-ConfigDedicated IE. At this time, a duplex type operating in a specific slot can be set. For this purpose, for example, 'duplex Type' is added to the TDD-UL-DL-SlotConfig of TDD-UL-DL-ConfigDedicated IE, and the 'duplexType' indicates whether SS-FD operation or SB-FD operation is performed in the slot indicated by 'slotindex'. At this time, if such configuration information does not exist, it may mean that the corresponding slot corresponds to the first time resource. If such configuration information exists, it may mean that the corresponding slot corresponds to the second time resource. Additionally, in the case of the second time resource, the UE can determine whether to perform the SB-FD operation or the SS-FD operation in the corresponding slot through the corresponding configuration information.

The network may determine the "first time resource" and "second time resource" and the "first frequency resource" and "second frequency resource" as described in Section A above, and in connection therewith, provide the UE with information about the "first time resource" and "second time resource" as described in Section B above. The network performs DL transmission to the UE in '1-1 time resource within the first time' and 'first frequency resource within the second time resource', and UL reception is performed from the UE in '1-2 time resource within the first time resource' and 'second frequency resource within second time resource'.

With respect to the "first time resource" and "second time resource" as described in Section A above, and the "first frequency resource" and "second frequency resource", the UE may receive information from the network about the "first time resource" and "second time resource" as described in Section B above and determine the location of the resource. The UE performs DL reception from the network through all or part of the '1-1 time resource in the first time' and 'first frequency resource in the second time resource', and performs UL transmission to the network in '1-2 time resource within the first time resource' and 'second frequency resource within the second time resource'.

C. Method for Determining Frequency Resources for SB-FD and SS-FD Operations

In this disclosure, proposed are a method for a UE to determine the first and second frequency resources as in A above, and configuration information that the network transmits to the UE for this purpose.

When performing FD operations such as SB-FD and SS-FD, assuming that the base station operates in full duplex and the UE operates in half duplex, the UE performs only one of DL and UL operations in a specific time resource. In this case, the UE receives UL/DL resource configuration information from the network as before, determines the DL/UL resource type to apply in a specific time resource, and frequency resources for performing DL/UL operations can be determined by receiving DL/UL BWP information from the network.

In this case, if the network performs SB-FD or SS-FD operation, some of the frequency resources constituting the DL BWP (UL BWP) set for the UE may correspond to the second frequency resource used for UL operation (the first frequency resource used for DL operation).

In this case, the network should properly perform DL configuration/scheduling so that the UE does not perform DL reception (UL transmission) on the second frequency resource (first frequency resource) included in the UE's DL BWP (UL BWP). In other words, the UE should not perform UL transmission on frequency resources operated by the cell as DL, or the UE should not perform DL reception on frequency resources operated by the cell as UL.

However, the network burden may be too great to prevent the above problems from occurring only through network scheduling/configuration. Considering that situations may arise where it is difficult to ensure that the UE operates through the correct frequency resource through existing BWP configurations and/or signal/channel settings/scheduling, etc., it may be helpful to explicitly inform the UE of the location information of frequency resources operating in DL/UL. If the UE knows this information, the UE can operate more efficiently/effectively by switching bandwidth filtering, BWP, signal/channel transmission resources, power control method, etc. according to time resources.

To address these problems, it is necessary for the UE to know the second frequency resource that cannot perform DL transmission and/or determine the first frequency resource that cannot perform UL transmission, so that the UE does not perform DL reception on the second frequency resource and/or does not perform UL transmission on the first frequency resource on the second time resource.

For this purpose, the UE needs to know information about the second frequency resource and/or information about the first frequency resource.

To this end, this disclosure proposes a method for a UE to determine a first frequency resource and a second frequency resource, and configuration information that the network transmits to the UE for this purpose.

The UE may determine that the first frequency resource and the second frequency resource are applied only to the second time resource and not to the first time resource. That is, in the first time resource, it is determined that all frequency resources are used for DL or UL, regardless of information about the first frequency resource and the second frequency resource.

Figure 17:
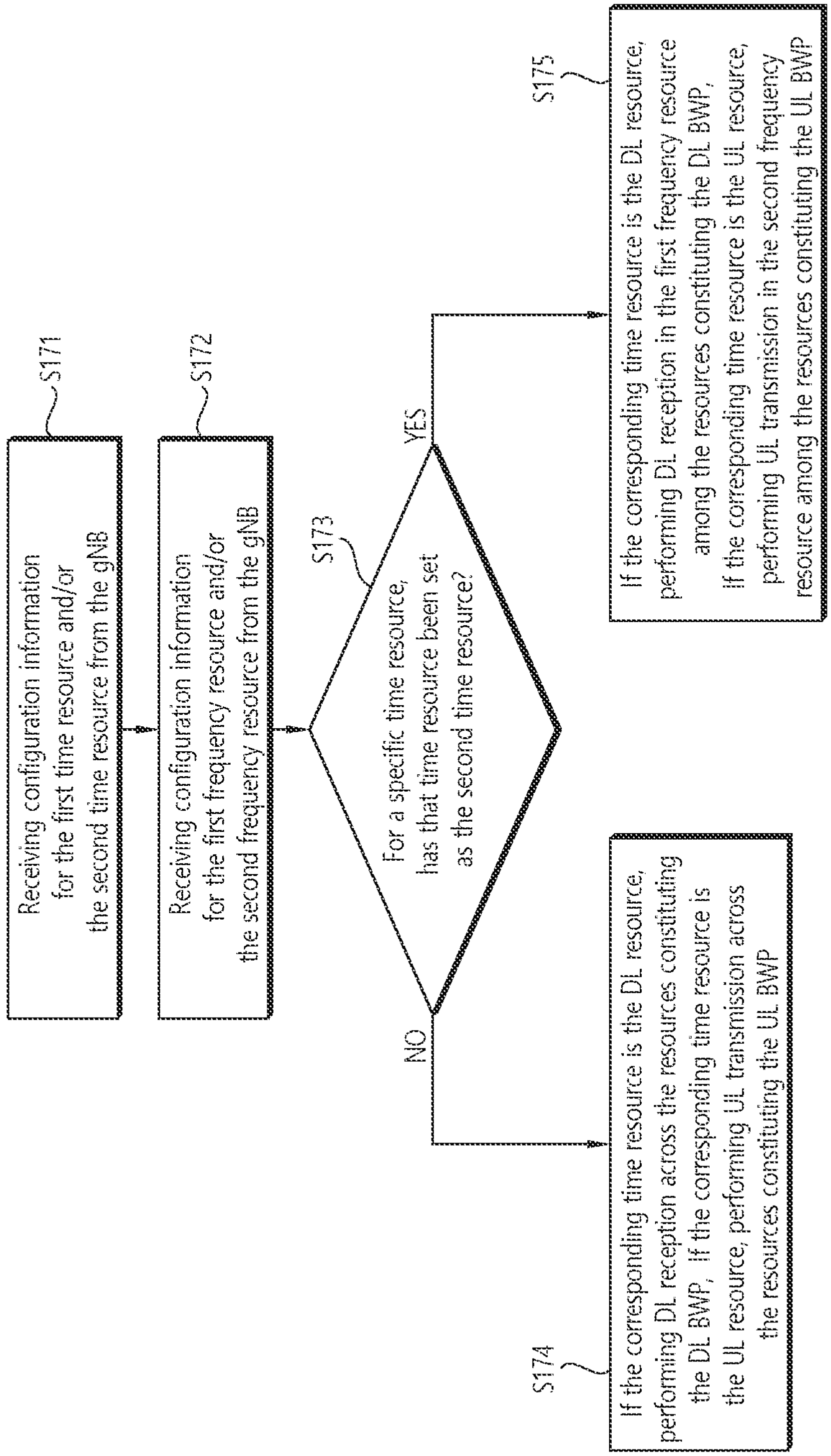
FIG. 17 is another example of the operation process of the UE.

FIG. 17 is another example of the operation process of the UE.

The operation process of FIG. 17 is the operation described in FIG. 16 by adding a process in which the UE receives configuration information about the first frequency resource and/or the second frequency resource from the base station.

Referring to FIG. 17, the UE first receives configuration information from the base station regarding whether a specific time resource is included in the first time resource and/or the second time resource (S171). The UE receives information about the frequency resource included in the first frequency resource and/or information about the frequency resource included in the second frequency resource from the base station (S172).

Based on the above process, the UE determines whether a specific time resource corresponds to the first time resource or the second time resource (S173). When the corresponding time resource is the first time resource (i.e., not set as the second time resource), the UE may perform configured/scheduled DL reception across the resources constituting the DL BWP if the corresponding time resource is a resource set to perform DL reception, and may perform configured/scheduled UL transmission across the resources constituting the UL BWP if the corresponding time resource is a resource set to perform UL transmission (S174).

When the corresponding time resource is a second time resource, the UE may perform the configured/scheduled DL reception within the frequency resource corresponding to the first frequency resource among the resources constituting the DL BWP if the corresponding time resource is a resource set to perform DL reception, and may perform the configured/scheduled UL transmission within the frequency resource corresponding to the second frequency resource among the resources constituting the UL BWP if the corresponding time resource is a resource set to perform UL transmission (S175).

In the following, a process is proposed for a UE to receive configuration information regarding a first frequency resource and/or a second frequency resource from a network and to determine a frequency resource included in the first frequency resource and the second frequency resource from the configuration information.

More specifically, the following methods can be used in relation to setting and determining first frequency resource and second frequency resource information. For this purpose, one of the following methods may be applied, or a plurality of methods may be applied in combination.

(a) Method of providing location information of the first frequency resource and/or the second frequency resource.

The network sets information about the first frequency resource and/or information about the second frequency resource to the UE. The UE receives information about the first frequency resource and/or information about the second frequency resource from the network. This frequency information can be set in PRB or RBG (resource block group) units. At this time, reference subcarrier spacing information corresponding to the frequency resource may also be set.

When the UE receives only information about the first frequency resource, the UE determines that the remaining frequency resources correspond to the second frequency resource. Alternatively, when the UE receives only information about the second frequency resource, the UE determines that the remaining frequency resources correspond to the first frequency resource.

This configuration information may be transmitted cell-specifically through SI (system information). More specifically, the following methods can be used.

i) Frequency resource information corresponding to the first frequency resource and/or the second frequency resource is set through TDD-UL-DL-ConfigCommon IE. These frequency configurations are set assuming 'referenceSubcarrierSpacing' set through TDD-UL-DL-ConfigCommon IE. In this case, this frequency configuration can be applied equally to all time resources corresponding to the second time resource.

ii) Frequency resource information corresponding to the first frequency resource and/or the second frequency resource is set through the TDD-UL-DL-Pattern of TDD-UL-DL-ConfigCommon IE.

At this time, frequency resource information corresponding to one first frequency resource and/or second frequency resource is set for a specific TDD-UL-DL-Pattern, and this configuration information can be applied equally to the time resource corresponding to the second time resource within the time resource to which the TDD-UL-DL-Pattern is applied.

Alternatively, frequency resource information corresponding to the first frequency resource and/or the second frequency resource may be set on a symbol or slot basis within the time resources constituting a specific TDD-UL-DL-Pattern. For example, a plurality of frequency resource information may be set, and a slot index to which each frequency resource information is applied may be set. This configuration information may be repeated with a period of 'dl-UL-TransmissionPeriodicity'.

Alternatively, this configuration information may be transmitted UE-specifically through RRC. More specifically, the following methods can be used.

i) Frequency resource information corresponding to the first frequency resource and/or the second frequency resource is set through TDD-UL-DL-ConfigDedicated IE. In this case, these frequency configurations can be set assuming 'referenceSubcarrierSpacing' set through TDD-UL-DL-ConfigCommon IE.

At this time, this frequency configuration can be applied equally to all time resources corresponding to the second time resource.

Alternatively, frequency resource information corresponding to the first frequency resource and/or the second frequency resource may be set on a symbol or slot basis. For example, a plurality of frequency resource information may be set, and a slot index to which each frequency resource information is applied may be set.

ii) Resource types (DL, UL, F) for symbols constituting a specific slot are set through TDD-UL-DL-ConfigDedicated IE. At this time, information about frequency resources that the UE can use in a specific slot is additionally set. For this purpose, for example, 'resourceBlocks' is added to the TDD-UL-DL-SlotConfig of TDD-UL-DL-ConfigDedicated IE, and 'resourceBlocks' sets information about the frequency resources available in the slot indicated by 'slotIndex'. At this time, information about frequency resources may specifically be as follows.

Directly, the location and amount of frequency resources available to the UE for DL and/or UL are set.

Alternatively, it is configured whether the UE can use its entire frequency resource for DL and/or UL, or only a limited frequency resource for DL and/or UL. At this time, information about limited frequency resources can be set separately (via SI or RRC).

Additionally/independently, the amount and location of guard frequency resources may be defined or set to the UE from the network. For this purpose, the network can set information about guard frequency resources to the UE. If the guard frequency resource overlaps with the first frequency resource and/or the second frequency resource, the UE determines that the remaining frequency resources excluding the guard frequency resource from the first and second frequency resources correspond to the first and second frequency resources, respectively. Information on these guard frequency resources is notified to the UE, and the method for the UE to determine may be as follows (b) below. The UE does not perform DL reception or UL transmission on these guard frequency resources.

(b) A method for providing information about guard frequency resources.

The network can provide/set information about guard frequency resources to the UE. The UE can be provided/received information about guard frequency resources from the network. This frequency information can be set in PRB or RBG units. At this time, reference subcarrier spacing information assumed for setting guard frequency resources may also be set.

Figure 18:
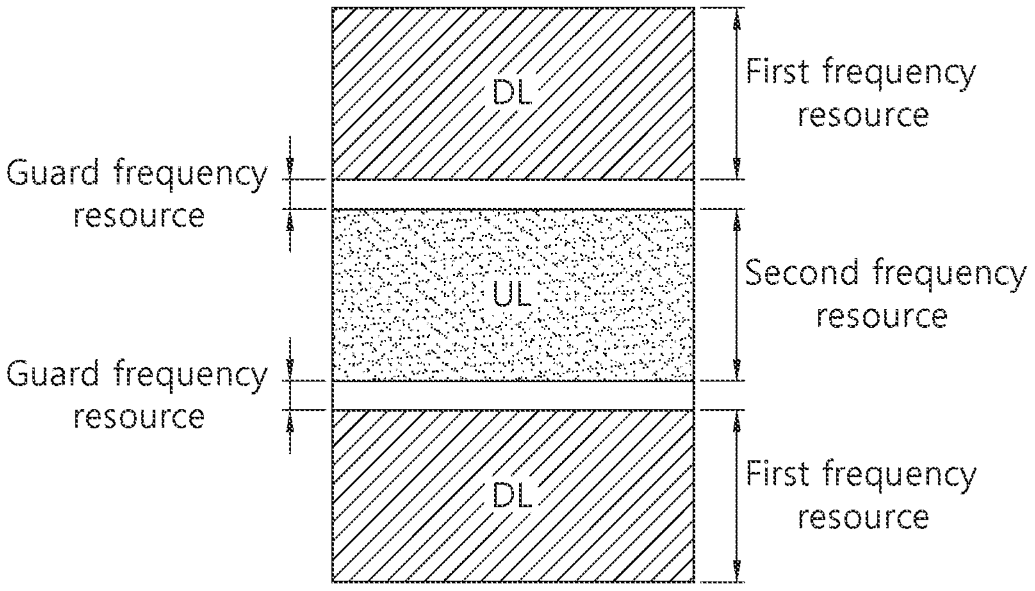
FIG. 18 illustrates guard frequency resources.

FIG. 18 illustrates guard frequency resources.

Referring to FIG. 18, the guard frequency resource may be located between the first frequency resource and the second frequency resource. Guard frequency resources are required to reduce interference between first and second frequency resources.

At this time, information about the location and size (width/size) of the guard frequency resource can be set. More specifically, the frequency location where the guard frequency resource starts and the size of the guard frequency resource can be set.

Alternatively, only information about the size (width/size) of the guard frequency resource may be set. In this case, when the size of the guard frequency resource is $W_G$, the UE can determine the location of the guard frequency resource as follows.

1) The UE assumes that the guard frequency resource is located within the second frequency resource used as UL, and that guard frequency resources with a size of $W_G$ are located at both ends of the second frequency resource.

Alternatively, the UE assumes that the guard frequency resource is located outside the second frequency resource used as UL, and that guard frequency resources each having a size of $W_G$ are located adjacent to both ends of the second frequency resource.

At this time, the $W_G$ can be replaced with $W_G/2$ (or floor($W_G/2$) or ceil($W_G/2$)).

2) The UE determines that the guard frequency resource is located at the boundary between the first frequency resource and the second frequency resource when a first frequency resource used as DL and a second frequency resource used as UL exist for the same time resource. At this time, the location of the guard frequency resource may be as follows.

i) At the boundary between the first frequency resource and the second frequency resource, it is assumed that a guard frequency resource with a size of $W_G$ is located in the first frequency resource.

ii) At the boundary between the first frequency resource and the second frequency resource, it is assumed that a guard frequency resource with a size of $W_G$ is located in the second frequency resource.

iii) At the boundary between the first frequency resource and the second frequency resource, it is assumed that a guard frequency resource of size $W_G$ is located in a frequency resource consisting of PRB resources with the smaller index among the first frequency resource and the second frequency resource.

iv) At the boundary between the first frequency resource and the second frequency resource, it is assumed that a guard frequency resource with a size of $W_G$ is located in a frequency resource composed of PRB resources with a larger index among the first frequency resource and the second frequency resource.

v) At the boundary between the first frequency resource and the second frequency resource, it is assumed that guard frequency resources with sizes of $W_G$ or $W_G/2$ (or floor ($W_G/2$) or ceil ($W_G/2$) are located in the first frequency resource and the second frequency, respectively.

This configuration information may be transmitted cell-specifically through SI (system information). And/or this configuration information can be set UE-specifically through RRC.

(c) A method for providing subband information by dividing multiple subbands.

To configure information about the first frequency resource and/or information about the second frequency resource, the first frequency resource and the second frequency resource information are configured by dividing the system band of the cell into a plurality of subbands, and setting the number and location of the subbands to which the network applies to the UE.

For this purpose, the frequency resources of the cell are divided into a plurality of subbands. The method of configuring the subband may be, for example, as follows. At this time, the subband configuration can be applied independently (differently) to DL and UL resources. Reference subcarrier spacing information corresponding to the frequency resource may also be set.

Figure 19:
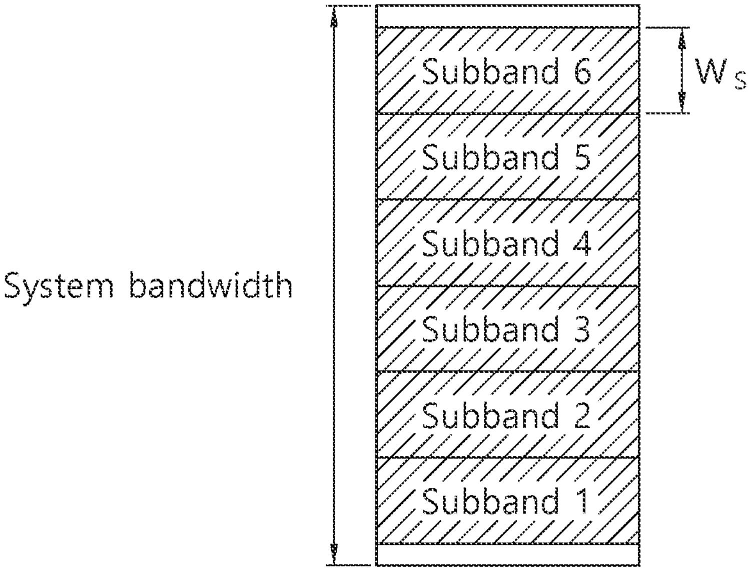
FIG. 19 shows an example in which a UE determines the frequency resources of each subband based on information about the frequency resources constituting each subband.
Figure 19:
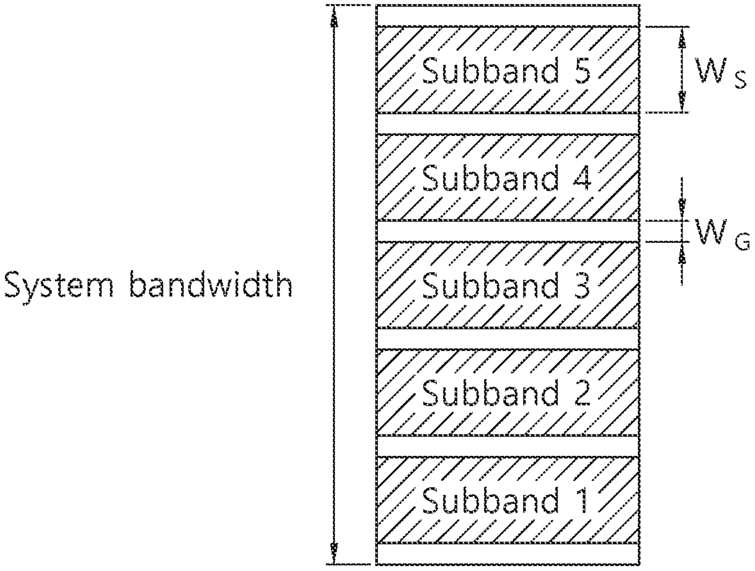

FIG. 19 shows an example in which a UE determines the frequency resources of each subband based on information about the frequency resources constituting each subband.

Referring to FIG. 19, the network sets information about the frequency resources constituting each subband to the UE, and the UE determines the frequency resources of each subband based on this configuration information. For this purpose, the following methods can be specifically used.

i) The UE determines that one or multiple subbands with the frequency axis size of $W_S$ are located using continuous frequency resources. The UE can receive a value corresponding to the size ($W_S$) of this subband from the network. An example of the configuration of such a subband is shown in (a) of FIG. 19. At this time, $W_S$ subcarriers or PRBs can be used as a unit. Hereinafter, frequency resource/frequency location may mean a subcarrier or PRB.

In the case of the first subband (subband 1), the starting point of the frequency resources constituting the subband may be as follows.

1) It may be a frequency resource with the lowest index of the system band.

Or, 2) it may be a frequency location corresponding to point A, which is a common reference point for the cell's resource block grids. At this time, point A is a value set by the network to the UE and may mean the 'absoluteFrequencyPointA' value in the table below.

TABLE 8

```
-- ASN1START
-- TAG-FREQUENCYINFODL-START
FrequencyInfoDL ::=          SEQUENCE {
  absoluteFrequencySSB          ARFCN-ValueNR                  OPTIONAL,
-- Cond SpCellAdd
  frequencyBandList          MultiFrequencyBandListNR,
  absoluteFrequencyPointA    ARFCN-ValueNR,
  scs-SpecificCarrierList    SEQUENCE (SIZE (1..maxSCSs)) OF SCS-SpecificCarrier,
  . . .
}
-- TAG-FREQUENCYINFODL-STOP
-- ASN1STOP
```

Or 3) it may correspond to number 0 CRB (common resource block).

For the first subband (subband 1), it consists of frequency resources of continuous $W_S$ size from the starting point of these frequency resources.

For the remaining subbands (subband n, where n>1), the starting point of the frequency resources constituting the subband may be as follows.

It may be the next frequency resource of the last frequency resource constituting the preceding subband (subband n−1) of the corresponding subband (subband n).

For the remaining subbands (subband n, where n>1), they are composed of frequency resources of continuous $W_S$ size from the starting point of these frequency resources.

At this time, the number of subbands can be determined as follows.

There are a total of $N_s$ subbands, and the network sets a value corresponding to the number of subbands ($N_s$) to the UE. When the UE receives these values from the network, it determines that $N_s$ subbands are located using continuous frequency resources. At this time, the value of $N_s$ may have a subcarrier or PRB as a unit.

When a subband is set within the frequency resources constituting the BWP, the subband may exist until the frequency resources constituting the subband do not deviate from the frequency resources constituting the BWP. That is, if the index of the last frequency resource comprising subband $N_S$ is k−1, and the value of $k+W_S$ is greater than the index of the last frequency resource comprising BWP, then subband $N_S$ becomes the last subband.

At this time, a guard subband may exist between the two subbands. The UE determines that a guard subband exists between subbands. When the frequency axis size (width/size) of the guard subband is equal to $W_G$, the value of $W_G$ can be defined and fixed to a specific value. Alternatively, the value of $W_G$ may be a value set from the network through SI/RRC, etc. At this time, the UE can determine the location of the guard subband as follows.

Among the frequency resources constituting each subband, $W_G$ consecutive frequency resources from the frequency resource with the highest index are determined to be a guard subband. At this time, it may be additionally determined that there is no guard subband in the last subband (subband with the highest index).

Among the frequency resources constituting each subband, $W_G$ consecutive frequency resources from the frequency resource with the lowest index are determined to be a guard subband. At this time, it may be additionally determined that there is no guard subband in the first subband (subband with the lowest index).

Given two consecutive subbands, subband n and subband n+1, it is determined that $W_G$ consecutive frequency resources from the frequency resources with the highest index among the frequency resources comprising subband n and $W_G$ consecutive frequency resources from the frequency resources with the lowest index among the frequency resources comprising subband n+1 comprise the guard subband. At this time, the $W_G$ can be replaced with $W_G/2$ (or floor($W_G/2$) or ceil($W_G/2$)).

When a subband is set within the frequency resources constituting the BWP, the values of $W_S$, $W_G$, and/or $N_S$ may be set/determined for each BWP.

At this time, the subband size $W_S$ can be independently set for each subband. In this case, the UE determines that the subband is configured using the $W_S$ value corresponding to the location of each subband.

The UE determines that one or more subbands with a frequency axis size of $W_S$ and one or more guard subbands with a frequency axis size of $W_G$ are located alternately using continuous frequency resources. An example of the configuration of such a subband is shown in (b) of FIG. 19. That is, when a plurality of subbands exist, a guard subband may be located between the two subbands.

The UE can receive a value corresponding to the size ($W_S$) of this subband from the network. The value of $W_G$ can be defined and fixed as a specific value. Alternatively, the value of $W_G$ may be a value set from the network through SI/RRC, etc. At this time, the values of $W_S$ and $W_G$ may have a subcarrier or PRB as a unit. The frequency resource/frequency location below may mean a subcarrier or PRB.

At this time, in the case of the first subband (subband 1), the starting point of the frequency resources constituting the subband may be as follows.

i) It may be a frequency resource with the lowest index of the system band.

ii) Alternatively, it may be a frequency location corresponding to point A, which is a common reference point for the cell's resource block grid. At this time, point A is a value set by the network to the UE and may mean the absoluteFrequency Point A value.

iii) Alternatively, it may correspond to number 0 CRB (common resource block).

iv) Alternatively, if the subband is set within the frequency resources constituting the BWP, it may correspond to the first PRB (PRB number 0) constituting the BWP.

For the first subband (subband 1), it consists of frequency resources of continuous $W_S$ size from the starting point of these frequency resources.

For the remaining subbands (subband n, where n>1), the starting point of the frequency resources constituting the subband may be as follows.

When the index of the last frequency resource constituting the previous subband (subband n−1) of the corresponding subband (subband n) is k−1, it may be a frequency resource with an index of $k+W_G$.

For the remaining subbands (subband n, where n>1), they are composed of frequency resources of continuous $W_S$ size from the starting point of these frequency resources.

At this time, the number of subbands can be determined as follows.

There are a total of $N_s$ subbands, and the network sets a value corresponding to the number of subbands ($N_s$) to the UE. When the UE receives these values from the network, it determines that $N_s$ subbands are located using continuous frequency resources. At this time, the value of $N_s$ may have a subcarrier or PRB as a unit.

When a subband is set within the frequency resources constituting the BWP, the subband may exist until the frequency resources constituting the subband do not deviate from the frequency resources constituting the BWP. That is, when the index of the last frequency resource constituting subband $N_S$ is k−1, and the value of $k+W^G+W_S$ is greater than the index of the last frequency resource constituting BWP, subband $N_S$ becomes the last subband.

When a subband is set within the frequency resources constituting the BWP, the values of $W_S$, $W_G$, and/or $N_S$ may be set/determined for each BWP.

At this time, the subband size $W_S$ can be independently set for each subband. In this case, the UE determines that the subband is configured using the $W_S$ value corresponding to the location of each subband.

The UE can be independently configured with the starting point and frequency axis size of the frequency resource corresponding to each subband from the network. At this time, the UE determines that each subband is configured using frequency resources of a continuous frequency axis size corresponding to the subband, starting from the starting point of the frequency resource corresponding to the subband.

At this time, specifically, the starting point of the frequency resource can be set as follows.

i) Cell-specifically, it may be the relative frequency position from the cell's starting RB.

ii) It may be a relative frequency position from the frequency position corresponding to point A, which is a common reference point for the cell's resource block grid. At this time, point A is a value set by the network to the UE and may mean the absoluteFrequency Point A value.

iii) Alternatively, it may be set in the form of a CRB (common resource block) index.

iv) It refers to the location of frequency resources within the BWP, and may be a relative frequency location from the start frequency location of the BWP. For example, it may be set in the form of a PRB index.

The network configures the UE with information about the frequency resources comprising the one or more guard subbands, and the UE determines the location of the guard subband and the frequency resources of the subband based on this configuration information. For this purpose, the following methods can be specifically used.

The network can set frequency resource information for one or multiple guard subbands to the UE. Each frequency resource information may consist of all or part of the following.

Frequency resource start location: Informs the start frequency resource location of each guard subband. More specifically, the index of the CRB where each guard subband starts can be informed. Alternatively, if the subband is set within the frequency resources constituting the BWP, the index of the PRB where each guard subband starts can be informed.

Frequency resource size (width/size): Informs the frequency resource size of each guard subband. More specifically, the number of CRBs where each guard subband starts can be informed. When a plurality of guard subbands exist, information on the size of frequency resources can be independently set for each guard subband. Alternatively, size information of one frequency resource may be set and commonly applied to a plurality of guard subbands.

When a subband is set within the frequency resources constituting a BWP, the above information can be set/determined for each BWP.

The UE can receive frequency resource information for the above guard subband from the network. In this case, the UE determines that the guard subband is located using frequency resources equal to the size of the continuous frequency resources from each frequency resource start position.

Additionally, as shown in (b) of FIG. 19, the UE determines each continuous frequency resource, excluding the guard subband area, as one subband. At this time, the index of each subband can be determined, starting with a subband composed of frequency resources with a small index.

When the frequency resource of a cell is divided into a plurality of subbands as described above, the network sets information about the subband corresponding to the first frequency resource and/or the second frequency resource to the UE. The UE receives information about the subband corresponding to the first frequency resource and/or the second frequency resource from the network.

The UE receives information about the first frequency resource and/or information about the second frequency resource from the network. At this time, reference subcarrier spacing information corresponding to the frequency resource may also be set.

When the UE receives only information about the first frequency resource, the UE determines that the remaining frequency resources correspond to the second frequency resource. Alternatively, when the UE receives only information about the second frequency resource, the UE determines that the remaining frequency resources correspond to the first frequency resource.

This configuration information may be transmitted cell-specifically through SI (system information) or UE-specifically through RRC. More specifically, the following methods can be used.

i) Indicates the index of the subband corresponding to the first frequency resource and/or the second frequency resource using the bitmap scheme.

ii) Set information about 'location of start subband' and 'number of subbands'. In this case, it means that consecutive subbands corresponding to the 'number of subbands' from the subband corresponding to the 'position of the start subband' are the first frequency resource or the second frequency resource.

(d) BWP-specific DL/UL resource configurations.

When a plurality of BWPs are configured for a UE, independent DL/UL resource configurations can be applied to each BWP. These DL/UL resource configurations may more specifically mean TDD-UL-DL-ConfigCommon and/or TDD-UL-DL-ConfigDedicated.

To this end, the network can set a plurality of DL/UL resource configurations for the UE and set a BWP ID to which each DL/UL resource configuration is linked. Depending on the BWP applied in a specific time resource, the UE determines the resource type in that time resource according to the DL/UL resource configuration corresponding to the ID of the BWP.

Alternatively, for this purpose, the network can set a plurality of DL/UL resource configurations for the UE and set the ID of the DL/UL resource configurations linked to the BWP when setting the BWP. The UE determines the resource type in the time resource according to the DL/UL resource configurations linked to the ID of the BWP according to the BWP applied in the specific time resource.

Additionally, TDD-UL-DL-ConfigCommon is applied equally to all BWPs, but only TDD-UL-DL-ConfigDedicated can be applied independently depending on the BWP of the UE. In this case, the DL/UL resource configuration may mean TDD-UL-DL-ConfigDedicated.

Additionally, only within the second time resource, DL/UL resource configurations can be applied independently according to the BWP of the UE. In this case, in the first time resource, the DL/UL resource configurations are applied equally to all BWPs, but in the second time resource, the DL/UL resource configurations may be applied differently depending on the BWP of the UE. The UE determines the resource type in the second time resource by applying the DL/UL resource configurations corresponding to the ID of the BWP according to the BWP it applies in the second time resource.

(e) Subband-specific DL/UL resource configuration.

Frequency resources constituting a cell can be divided into a plurality of subbands. At this time, independent DL/UL resource configurations can be applied depending on the subband. These DL/UL resource configurations may more specifically mean TDD-UL-DL-ConfigCommon and/or TDD-UL-DL-ConfigDedicated.

To this end, the network can set a plurality of DL/UL resource configurations to the UE and set the location information or ID of the subband to which each DL/UL resource configuration is linked. The UE determines the resource type in the corresponding subband resource according to the DL/UL resource configurations corresponding to each subband.

Alternatively, for this purpose, the network can configure a plurality of DL/UL resource configurations for the UE and set the ID of the DL/UL resource configurations linked to the subband when configuring a subband. The UE determines the resource type in the corresponding subband resource according to the DL/UL resource configurations corresponding to each subband.

Additionally. TDD-UL-DL-ConfigCommon is applied equally to all subbands, but only TDD-UL-DL-ConfigDedicated can be applied independently depending on the subband of the UE. In this case, the DL/UL resource configuration may mean TDD-UL-DL-ConfigDedicated.

Additionally, DL/UL resource configurations can be applied independently according to subband only within the second time resource. In this case, in the first time resource, the DL/UL resource configurations are applied equally to all subbands, but in the second time resource, the DL/UL resource configurations may be applied differently depending on the subband. The UE determines the resource type in the subband by applying the DL/UL resource configurations corresponding to the ID of the BWP according to the subband in the second time resource.

At this time, the subband can be specifically configured using the same method as in (c) above.

The network determines the 'first time resource' and 'second time resource' and the 'first frequency resource' and 'second frequency resource' as described in Section A above. In this regard, the network may provide the UE with information about the 'first time resource' and 'second time resource' as described in Section B above. Additionally or independently, the network may provide the UE with information about 'first frequency resource' and 'second frequency resource' as described in Section C above. The network performs DL transmission to the UE in these '1-1 time resource within the first time' and 'first frequency resource within the second time resource', and performs UL reception from the UE on '1-2 time resource within the first time resource' and 'second frequency resource within the second time resource'.

With respect to the "first time resource" and "second time resource" as described in Section A above, and the "first frequency resource" and "second frequency resource," the UE may determine the location of the resources by receiving information from the network as described in Section B above. Additionally or independently, the UE may receive information about the 'first frequency resource' and 'second frequency resource' from the network as described in section C above and determine the location of the resource. The UE performs DL reception from the network through all or part of the '1-1 time resource within the first time' and 'the first frequency resource within the second time resource', and performs UL transmission to the network in '1-2 time resource within the first time resource' and 'second frequency resource within the second time resource'.

Figure 20:
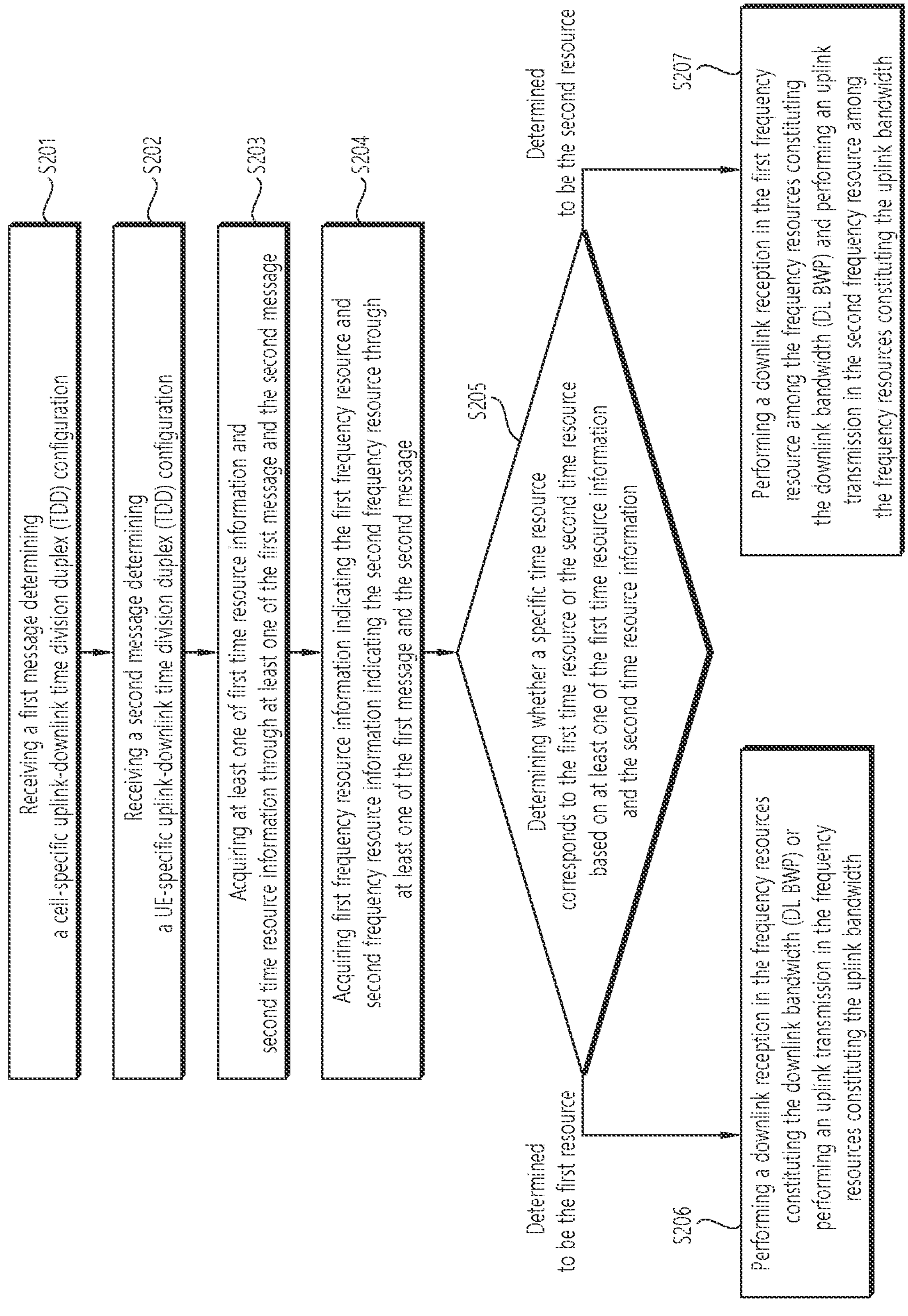
FIG. 20 shows a UE operation method according to an embodiment of the present disclosure.

FIG. 20 shows a UE operation method according to an embodiment of the present disclosure.

Referring to FIG. 20, the UE receives a first message determining a cell-specific uplink-downlink time division duplex (TDD) configuration (S201). The first message may be, for example, the TDD-UL-DL-ConfigCommon IE of Table 5 and the corresponding description described above. The first message may include reference subcarrier spacing and pattern information.

The reference subcarrier spacing is used to determine the time domain boundary in the uplink-downlink pattern.

The pattern information may include the periodicity of the downlink-uplink pattern (dl-UL-TransmissionPeriodicity), the number of consecutive downlink slots at the beginning of the downlink-uplink pattern (nrofDownlinkSlots), and the number of consecutive downlink symbols in the beginning of the slot following the last downlink slot of the consecutive downlink slots (nrofDownlinkSymbols), the number of consecutive uplink slots at the end of the downlink-uplink pattern (nrofUplinkSlots), and the number of consecutive uplink symbols in the end of the slot preceding the first slot of the consecutive uplink slots (nrofUplinkSymbols).

The UE receives a second message determining a UE-specific uplink-downlink time division duplex (TDD) configuration (S202). The second message may be, for example, the TDD-UL-DL-ConfigDedicated IE of Table 6, Table 7 and the corresponding description described above. The second message may include a slotindex and information indicating whether each symbol in the slot identified by the slotIndex is a downlink symbol, an uplink symbol, or a flexible symbol (e.g., allDownlink, allUplink, explicit, etc.).

The UE acquires at least one of first time resource information and second time resource information through at least one of the first message and the second message (S203).

The first time resource information may indicate a first time resource in which the base station is operating in half duplex (HD), and the second time resource information may indicate a second time resource in which the base station is operating in full duplex (FD). This is described in detail, for example, in (a) to (d) of "<Method for configuring the configuration information of the first time resource and the second time resource>" above.

For example, the first time resource information and the second time resource information may be received through the first message. Here, the first time resource information may be information indicating that a particular symbol is an uplink symbol or a downlink symbol in the first message, and the second time resource information may be information indicating that a particular symbol is a flexible symbol in the first message.

When the UE receives only the first time resource information, the remaining resources except the first time resource indicated by the first time resource information can be assumed to be the second time resource.

When the UE receives only the second time resource information, the remaining resources except the second time resource indicated by the second time resource information can be assumed to be the first time resource.

The UE may receive at least one of first time resource information and second time resource information through the second message. The second message may include information indicating whether a specific slot is a first time resource or a second time resource (e.g., "duplex Type" in Table 7).

The UE acquires first frequency resource information indicating the first frequency resource and second frequency resource information indicating the second frequency resource through at least one of the first message and the second message (S204). This has been described in detail, for example, in the above-mentioned "(a) Method of providing location information of the first frequency resource and/or the second frequency resource".

The UE determines whether a specific time resource corresponds to the first time resource or the second time resource based on at least one of the first time resource information and the second time resource information (S205).

If the UE determines that the specific time resource corresponds to the first time resource, the UE performs a downlink reception in the frequency resources constituting the downlink bandwidth (DL BWP) or performs an uplink transmission in the frequency resources constituting the uplink bandwidth (S206).

If the UE determines that the specific time resource corresponds to the second time resource, the UE performs a downlink reception in the first frequency resource among the frequency resources constituting the downlink bandwidth (DL BWP) and performs an uplink transmission in the second frequency resource among the frequency resources constituting the uplink bandwidth (S207).

According to the method described above, even in a situation where the base station is operating in full duplex and the UE is operating in half duplex, the UE can accurately determine the uplink/downlink resources, thereby preventing unnecessary interference from occurring and increasing the efficiency of communication.

Figure 21:
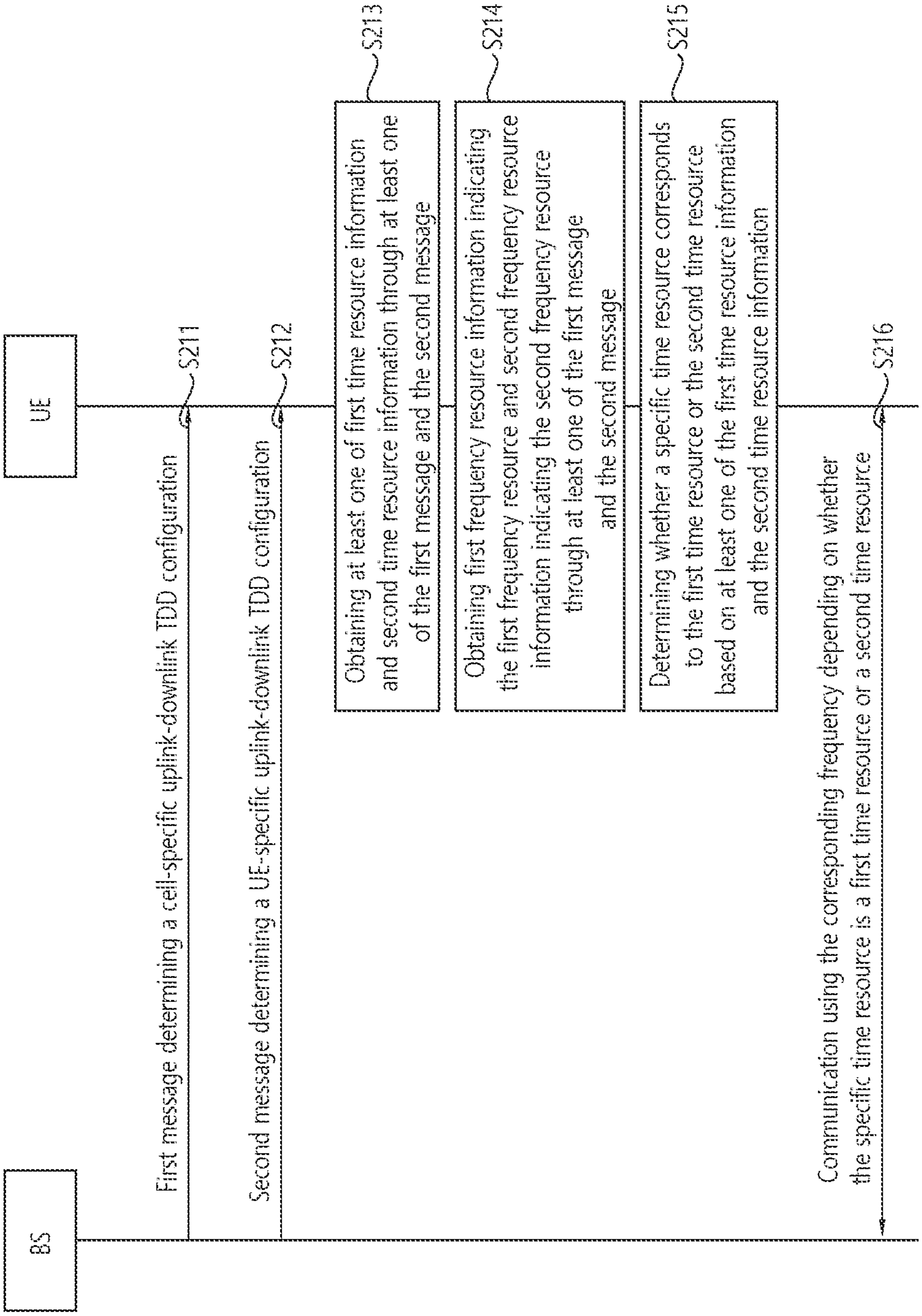
FIG. 21 shows the operations of a base station and a UE and a signaling process between the base station and the UE according to an embodiment of the present disclosure.

FIG. 21 shows the operations of a base station and a UE and a signaling process between the base station and the UE according to an embodiment of the present disclosure.

Referring to FIG. 21, the base station transmits a first message determining a cell-specific uplink-downlink TDD configuration to the UE (S211). The first message may be, for example, the TDD-UL-DL-ConfigCommon IE of Table 5 and the corresponding description described above. The first message may include reference subcarrier spacing and pattern information.

The base station transmits a second message determining a UE-specific uplink-downlink TDD configuration to the UE (S212). The second message may be, for example, the TDD-UL-DL-ConfigDedicated IE of Table 6, Table 7 and the corresponding description described above.

The UE obtains at least one of first time resource information and second time resource information through at least one of the first message and the second message (S213). First frequency resource information indicating the first frequency resource and second frequency resource information indicating the second frequency resource are obtained through at least one of the first message and the second message (S214).

The UE determines whether a specific time resource corresponds to the first time resource or the second time resource based on at least one of the first time resource information and the second time resource information (S215).

Depending on whether the specific time resource is a first time resource or a second time resource, communication is performed using the corresponding frequency (S216). From the base station perspective, if the specific time resource corresponds to the first time resource, it performs a downlink transmission to the UE in the frequency resources that constituting the downlink bandwidth (DL BWP) or a reception of an uplink transmission from the UE on the frequency resources constituting the uplink bandwidth. And, if the specific time resource corresponds to the second time resource, it performs a downlink transmission to the UE in the first frequency resource among the frequency resources constituting the downlink bandwidth (DL BWP) or performs a reception of an uplink transmission from the UE in the second frequency resource among the frequency resources constituting the uplink bandwidth.

Figure 22:
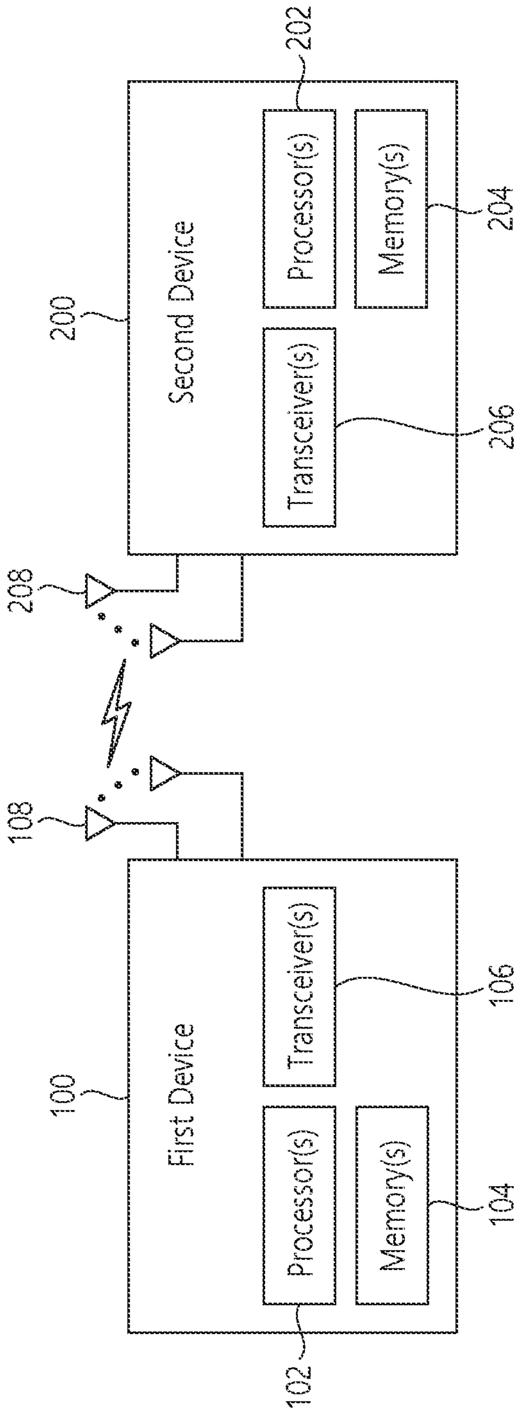
FIG. 22 illustrates a wireless device that can be applied the present specification.

FIG. 22 illustrates a wireless device applicable to the present specification.

Referring to FIG. 22, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 206 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes: receiving a first message determining a cell-specific uplink-downlink time division duplex (TDD) configuration, receiving a second message determining a UE-specific uplink-downlink time division duplex (TDD) configuration, obtaining, via at least one of the first message and the second message, at least one of first time resource information and second time resource information, the first time resource information informing a first time resource for which a base station is operating in half duplex (HD) and the second time resource information informing a second time resource for which the base station is operating in full duplex (FD), obtaining, via at least one of the first message and the second message, first frequency resource information for a first frequency resource and second frequency resource information for a second frequency resource, determining, based on at least one of the first time resource information and the second time resource information, whether a specific time resource corresponds to one of the first time resource and the second time resource, performing downlink reception on frequency resources constituting a downlink bandwidth (DL BWP) or uplink transmission on frequency resources constituting an uplink bandwidth based on the specific time resource corresponding to the first time resource, and performing downlink reception on the first frequency resource among frequency resources constituting the downlink bandwidth (DL BWP) and uplink transmission on the second frequency resource among frequency resources constituting the uplink bandwidth based on the specific time resource corresponding to the second time resource.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
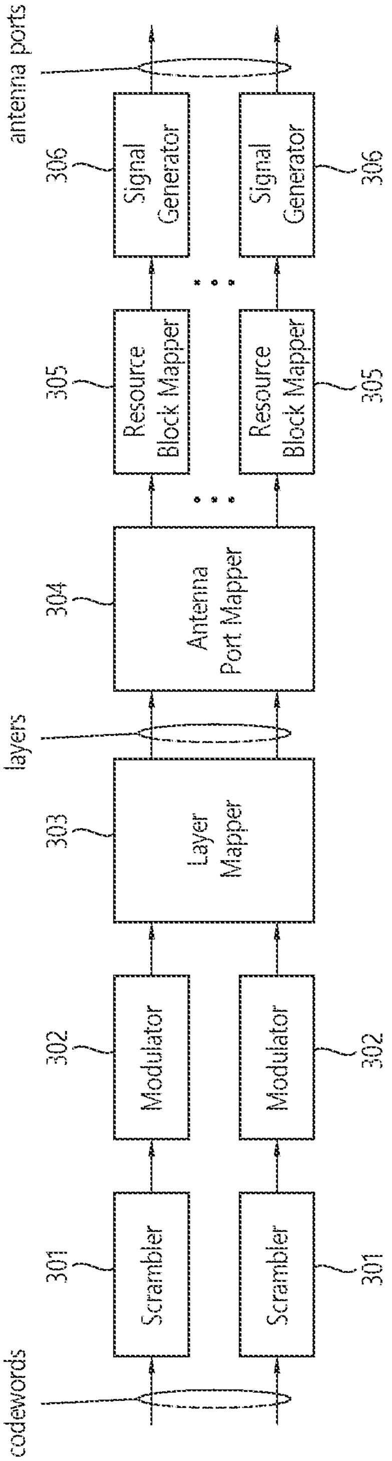
FIG. 23 shows an example of a signal processing module structure.

FIG. 23 shows an example of a structure of a signal processing module. Herein, signal processing may be performed in the processors 102 and 202 of FIG. 22.

Referring to FIG. 23, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 24:
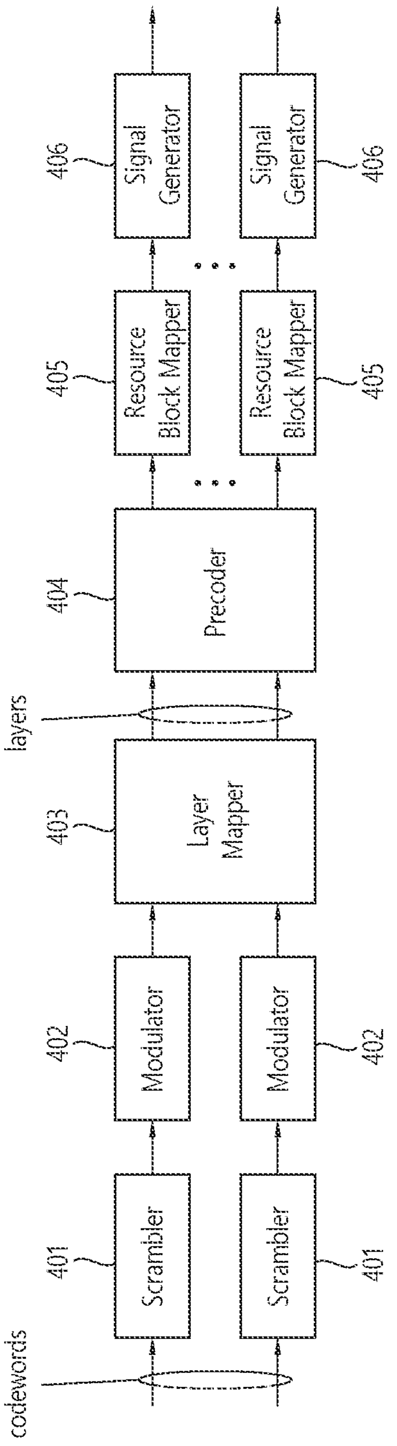
FIG. 24 shows another example of the structure of a signal processing module in a transmission device.

FIG. 24 shows another example of a structure of a signal processing module in a transmitting device. Herein, signal processing may be performed in a processor of a UE/BS, such as the processors 102 and 202 of FIG. 22.

Referring to FIG. 24, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport lavers by the multiplexer and the transport layers are restored by the channel demodulator to codewords intended to be transmitted by the transmitting device.

Figure 25:
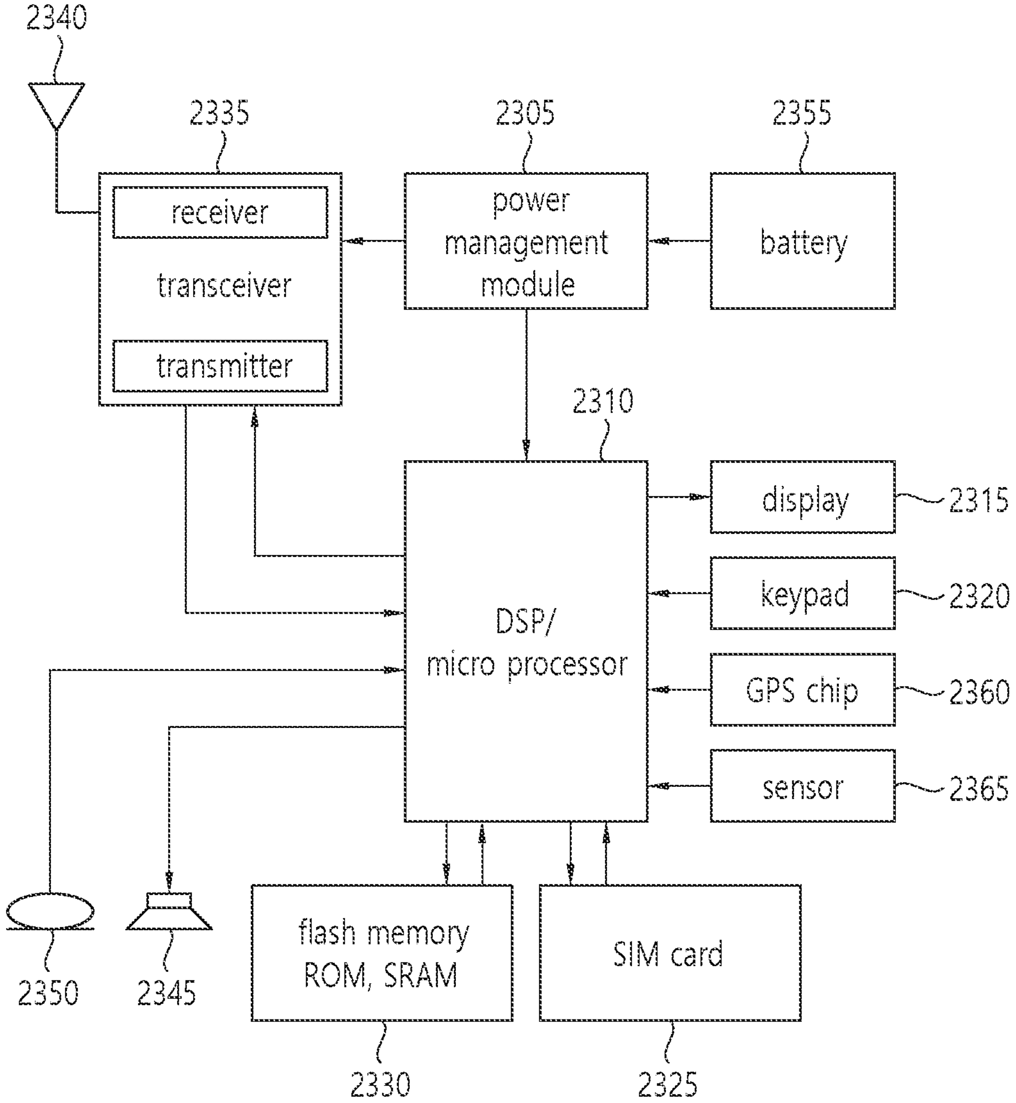
FIG. 25 shows an example of a wireless communication device according to an implementation example of the present disclosure.

FIG. 25 illustrates an example of a wireless communication device according to an implementation example of the present disclosure.

Referring to FIG. 25, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 25 may be the processors 102 and 202 in FIG. 22.

The memory 2330 is connected to the processor 2310 and stores information related to operations of the processor. The memory may be located inside or outside the processor and connected to the processor through various techniques such as wired connection and wireless connection. The memory 2330 in FIG. 25 may be the memories 104 and 204 in FIG. 22.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 25 may be the transceivers 106 and 206 in FIG. 22.

Although not shown in FIG. 25, various components such as a camera and a universal serial bus (USB) port may be additionally included in the UE. For example, the camera may be connected to the processor 2310.

FIG. 25 is an example of implementation with respect to the UE and implementation examples of the present disclosure are not limited thereto. The UE need not essentially include all the components shown in FIG. 25. That is, some of the components, for example, the keypad 2320, the GPS chip 2360, the sensor 2365 and the SIM card 2325 may not be essential components. In this case, they may not be included in the UE.

Figure 26:
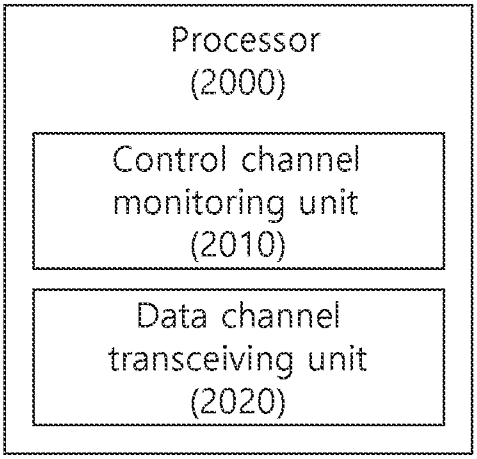
FIG. 26 shows an example of the processor 2000.

FIG. 26 shows an example of the processor 2000.

Referring to FIG. 26, the processor 2000 may include a control channel monitoring unit 2010 and a data channel transceiving unit 2020. The processor 2000 may execute the methods (receiver's perspective) described in FIGS. 20 and 21. For example, the processor 2000 receives a first message determining a cell-specific uplink-downlink time division duplex (TDD) configuration, receives a second message determining a UE-specific uplink-downlink time division duplex (TDD) configuration. The processor 2000 obtains, via at least one of the first message and the second message, at least one of first time resource information and second time resource information, the first time resource information informing a first time resource for which a base station is operating in half duplex (HD) and the second time resource information informing a second time resource for which the base station is operating in full duplex (FD), obtains, via at least one of the first message and the second message, first frequency resource information for a first frequency resource and second frequency resource information for a second frequency resource.

The processor 2000 determines, based on at least one of the first time resource information and the second time resource information, whether a specific time resource corresponds to one of the first time resource and the second time resource, performs downlink reception on frequency resources constituting a downlink bandwidth (DL BWP) or uplink transmission on frequency resources constituting an uplink bandwidth based on the specific time resource corresponding to the first time resource, and performs downlink reception on the first frequency resource among frequency resources constituting the downlink bandwidth (DL BWP) and uplink transmission on the second frequency resource among frequency resources constituting the uplink bandwidth based on the specific time resource corresponding to the second time resource. The processor 2000 may be an example of the processors 102 and 202 of FIG. 22.

Figure 27:
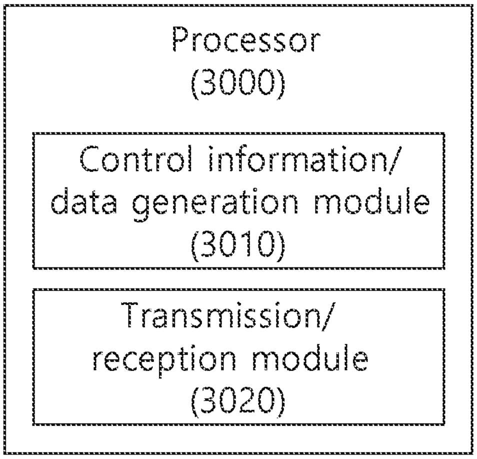
FIG. 27 shows an example of the processor 3000.

FIG. 27 shows an example of the processor 3000.

Referring to FIG. 27, the processor 3000 may include a control information/data generation module 3010 and a transmission/reception module 3020. The processor 3000 may execute the methods described in FIGS. 20 and 21 from the transmitter's perspective. For example, the processor 3000 transmits a first message determining a cell-specific uplink-downlink time division duplex (TDD) configuration to a user equipment (UE) and transmits a second message determining a UE-specific uplink-downlink time division duplex (TDD) configuration to the UE. The processor 3000 provides to the UE, via at least one of the first message and the second message, at least one of first time resource information and second time resource information, the first time resource information informing a first time resource for which the base station is operating in half duplex (HD) and the second time resource information informing a second time resource for which the base station is operating in full duplex (FD).

The processor 3000 provides to the UE, via at least one of the first message and the second message, first frequency resource information for a first frequency resource and second frequency resource information for a second frequency resource.

The processor 3000 performs downlink transmission to the UE on frequency resources constituting a downlink bandwidth (DL BWP) or uplink reception from the UE on frequency resources constituting an uplink bandwidth based on specific time resource corresponding to the first time resource, and performs downlink transmission to the UE on the first frequency resource among frequency resources constituting the downlink bandwidth (DL BWP) or uplink reception from the UE on the second frequency resource among frequency resources constituting the uplink bandwidth based on the specific time resource corresponding to the second time resource. The processor 3000 may be an example of the processors 102 and 202 of FIG. 22.

Figure 28:
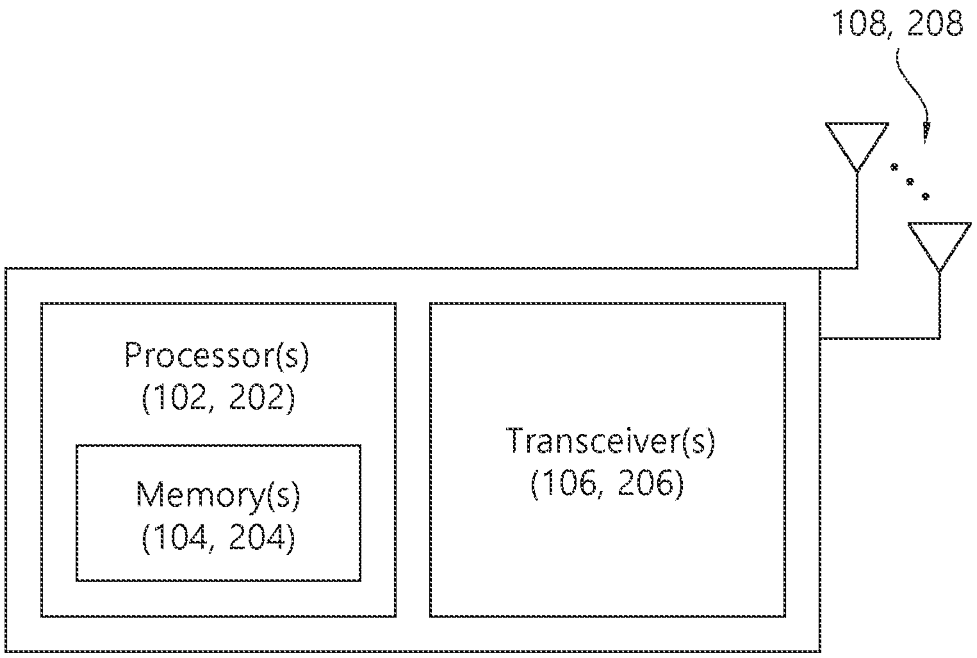
FIG. 28 shows another example of a wireless device.

FIG. 28 shows another example of a wireless device.

Referring to FIG. 28, the wireless device may include one or more processors 102 and 202, one or more memories 104 and 204, one or more transceivers 106 and 206 and one or more antennas 108 and 208.

The example of the wireless device described in FIG. 28 is different from the example of the wireless described in FIG. 22 in that the processors 102 and 202 and the memories 104 and 204 are separated in FIG. 22 whereas the memories 104 and 204 are included in the processors 102 and 202 in the example of FIG. 28. That is, the processor and the memory may constitute one chipset.

Figure 29:
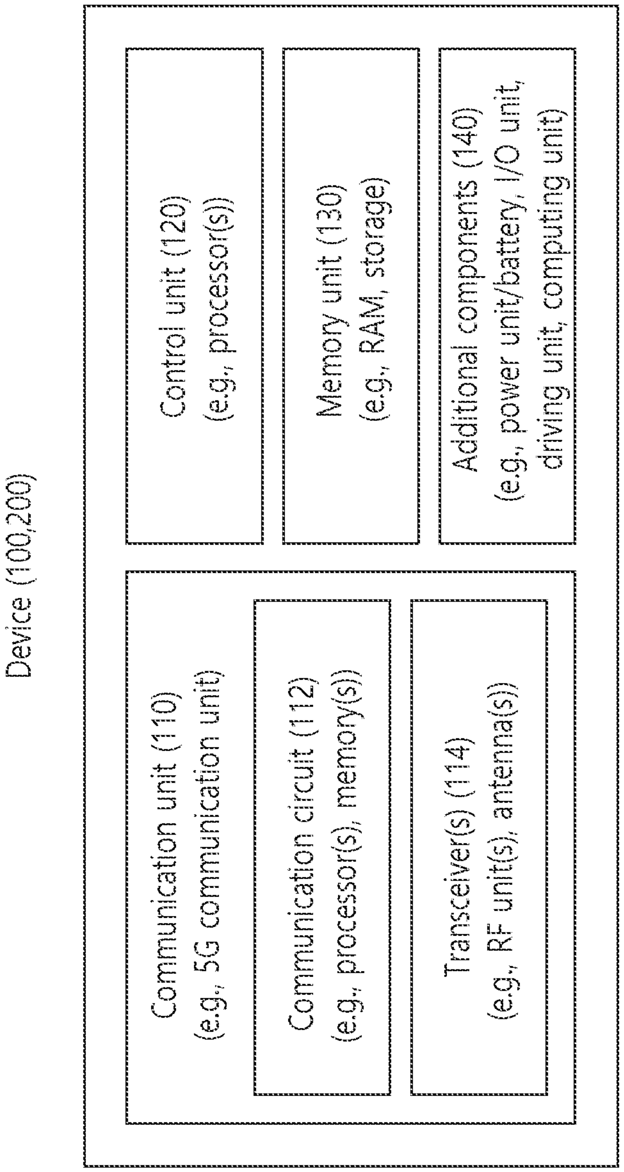
FIG. 29 shows another example of a wireless device applied to the present specification.

FIG. 29 shows another example of a wireless device applied to the present specification. The wireless device may be implemented in various forms according to a use-case/service.

Referring to FIG. 29, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot 100*a* of FIG. 31, the vehicles 100*b*-1, 100*b*-2 of FIG. 31, the XR device 100*c* of FIG. 31, the hand-held device 100*d* of FIG. 31, the home appliance 100*e* of FIG. 31, the IoT device 100*f* of FIG. 31, a digital broadcast UE, a hologram device, a public safety device, an MTC device, a medicine device, a fintech device (or a finance device), a security device, a climate/environment device, the AI server/device 400 of FIG. 31, the BSs 200 of FIG. 31, a network node, etc. The wireless device may be used in a mobile or fixed place according to a use-example/service.

In FIG. 29, various elements, components, units/parts, and/or modules within the wireless devices 100 and 200 may be entirely interconnected through a wired interface, or at least a portion may be wirelessly connected through the communication unit 110. For example, within the wireless devices 100 and 200, the control unit 120 and the communication unit 110 may be connected by wire, and the control unit 120 and the first unit (e.g., 130 and 140) may be connected through the communication unit 110. Additionally, each element, component, unit/part, and/or module within the wireless devices 100 and 200 may further include one or more elements. For example, the control unit 120 may be comprised of one or more processor sets. For example, the control unit 120 may be comprised of a communication control processor, an application processor, an electronic control unit (ECU), a graphics processing processor, and a memory control processor. As another example, the memory unit 130 includes random access memory (RAM), dynamic RAM (DRAM), read only memory (ROM), flash memory, volatile memory, and non-volatile memory, volatile memory) and/or a combination thereof.

Figure 30:
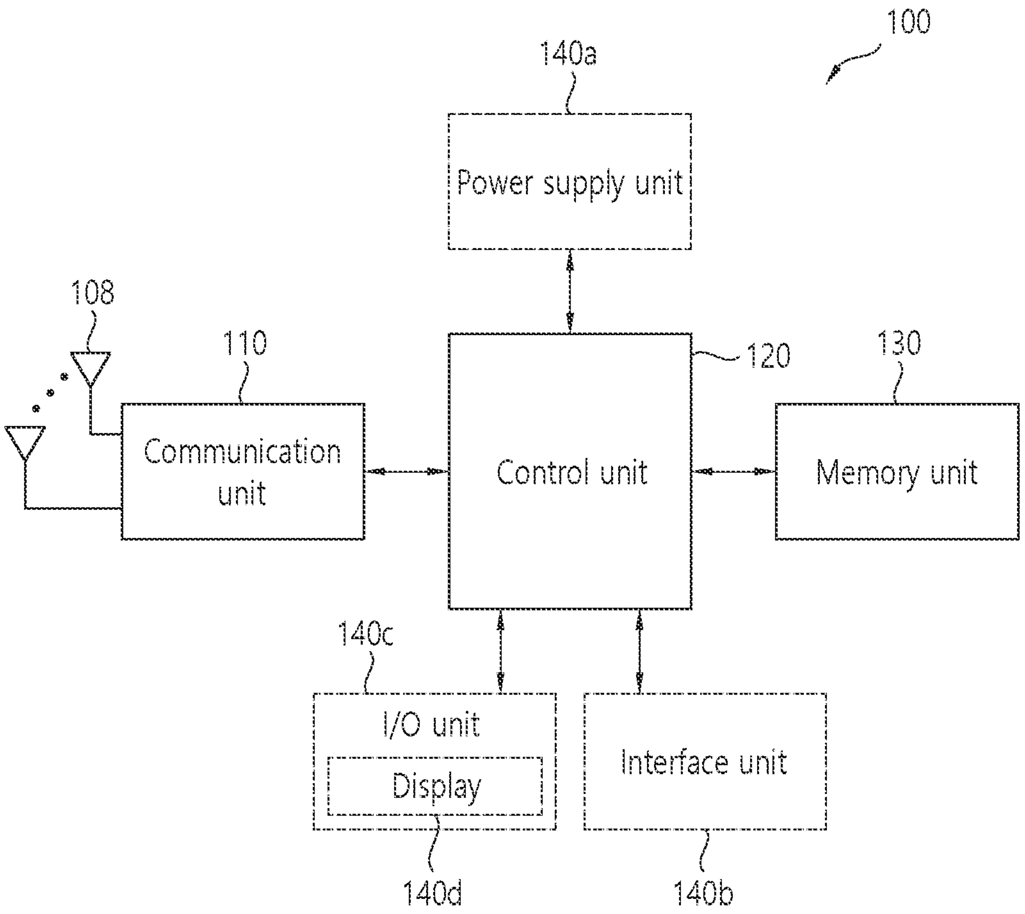
FIG. 30 illustrates a hand-held device applied to the present specification.

FIG. 30 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 29.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 31:
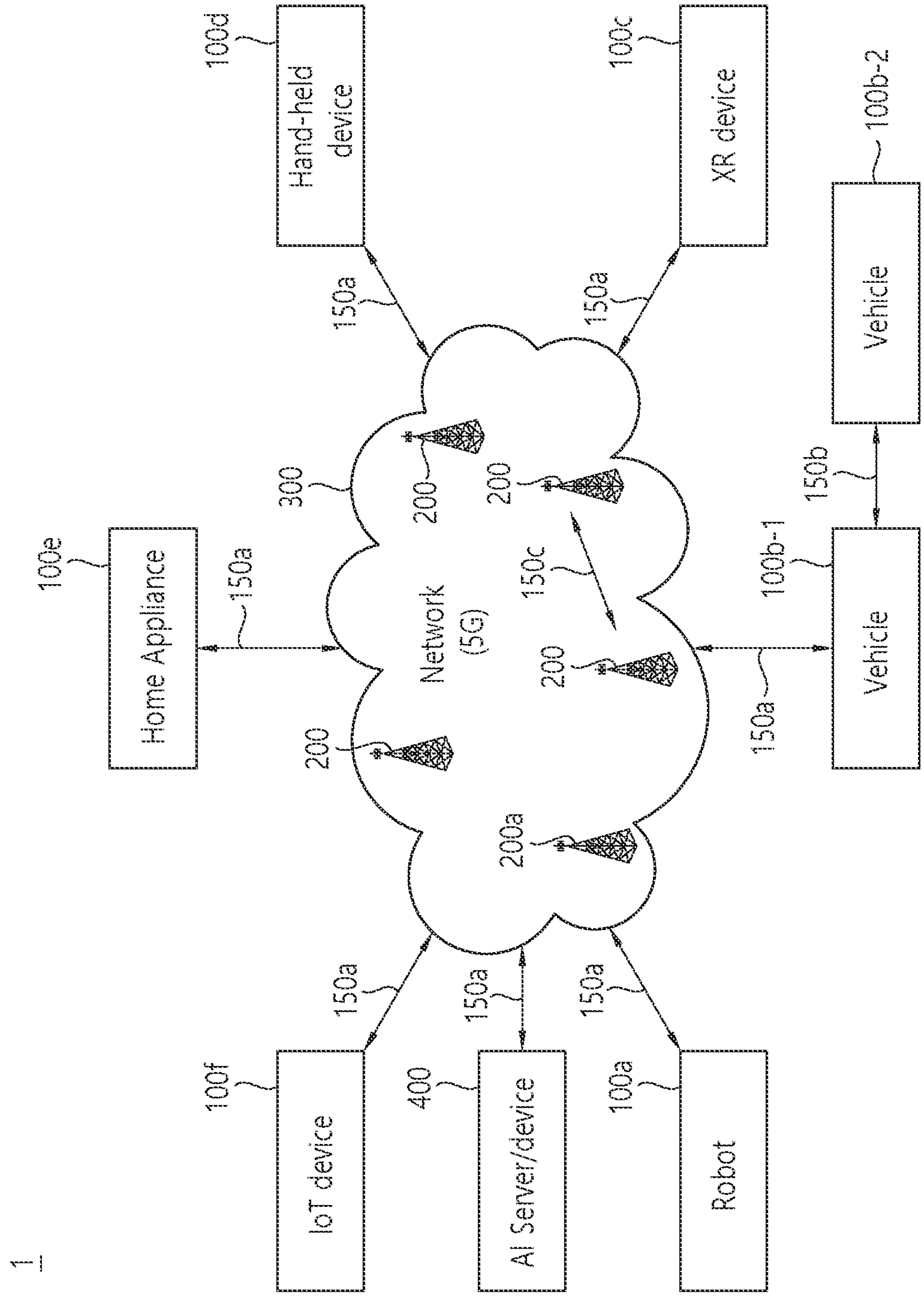
FIG. 31 illustrates the communication system 1 applied to this specification.

FIG. 31 illustrates a communication system 1 applied to the present specification.

Referring to FIG. 31, a communication system 1 applied to the present specification includes wireless devices. Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 KHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 9. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 9

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 10 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 10

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method comprising:

receiving, by a user equipment (UE), i) time division duplex (TDD) configuration information related to subband full duplex (SBFD) symbols and ii) frequency information related to an uplink subband and at least one downlink subband; and performing, by the UE, at least one of uplink transmission and downlink reception in an SBFD symbol of the SBFD symbols, wherein, in the SBFD symbol, the UE transmits or receives in resource blocks (RBs) that are both in an active uplink bandwidth part (UL BWP) and in the uplink subband, or both in an active downlink bandwidth part (DL BWP) and in the at least one downlink subband, respectively, wherein the TDD configuration information comprises pattern information that comprises a periodicity of a downlink-uplink pattern, and wherein a configuration period of the SBFD symbols is the periodicity of the downlink-uplink pattern.

2. The method of claim 1, wherein time resources which are not the SBFD symbols are determined as half duplex (HD) time resources.

3. The method of claim 1, wherein the UE supports an SBFD operation.

4. The method of claim 1, wherein the uplink subband is configured by uplink frequency information, a first downlink subband of the at least one downlink subband is configured by first downlink frequency information, and a second downlink subband of the at least one downlink subband is configured by second downlink frequency information.

5. A user equipment (UE), the UE comprising:

at least one transceiver;

at least one memory; and at least one processor operatively connected to the at least one transceiver and the at least one memory, wherein the at least one memory stores instructions that, based on being executed by the at least one processor, cause the at least one processor to perform operations comprising:

receiving i) time division duplex (TDD) configuration information related to subband full duplex (SBFD) symbols and ii) frequency information related to an uplink subband and at least one downlink subband; and performing at least one of uplink transmission and downlink reception in an SBFD symbol of the SBFD symbols, wherein, in the SBFD symbol, the UE transmits or receives in resource blocks (RBs) that are both in an active uplink bandwidth part (UL BWP) and in the uplink subband, or both in an active downlink bandwidth part (DL BWP) and in the at least one downlink subband, respectively, wherein the TDD configuration information comprises pattern information that comprises a periodicity of a downlink-uplink pattern, and wherein a configuration period of the SBFD symbols is the periodicity of the downlink-uplink pattern.

6. The UE of claim 5, wherein time resources which are not the SBFD symbols are determined as half duplex (HD) time resources.

7. The UE of claim 5, wherein the UE supports an SBFD operation.

8. The UE of claim 5, wherein the uplink subband is configured by uplink frequency information, a first downlink subband of the at least one downlink subband is configured by first downlink frequency information, and a second downlink subband of the at least one downlink subband is configured by second downlink frequency information.

9. A method comprising:

transmitting, by a base station, i) time division duplex (TDD) configuration information related to subband full duplex (SBFD) symbols and ii) frequency information related to an uplink subband and at least one downlink subband; and performing, by the base station, at least one of uplink reception and downlink transmission in an SBFD symbol of the SBFD symbols, wherein, in the SBFD symbol, the base station receives or transmits in resource blocks (RBs) that are both in an active uplink bandwidth part (UL BWP) and in the uplink subband, or both in an active downlink bandwidth part (DL BWP) and in the at least one downlink subband, respectively, wherein the TDD configuration information comprises pattern information that comprises a periodicity of a downlink-uplink pattern, and wherein a configuration period of the SBFD symbols is the periodicity of the downlink- uplink pattern.

10. The method of claim 9, wherein time resources which are not the SBFD symbols are determined as half duplex (HD) time resources.

11. The method of claim 9, wherein the base station supports an SBFD operation.

12. The method of claim 9, wherein the uplink subband is configured by uplink frequency information, a first downlink subband of the at least one downlink subband is configured by first downlink frequency information, and a second downlink subband of the at least one downlink subband is configured by second downlink frequency information.

13. The method of claim 1, wherein the frequency information is applied in the SBFD symbols.

14. The UE of claim 5, wherein the frequency information is applied in the SBFD symbols.

15. The method of claim 9, wherein the frequency information is applied in the SBFD symbols.

* * * * *